(12) United States Patent
Davidson

(10) Patent No.: US 11,782,701 B2
(45) Date of Patent: Oct. 10, 2023

(54) SOFTWARE UPDATER

(71) Applicant: Stephen Davidson, Carrollton, TX (US)

(72) Inventor: Stephen Davidson, Carrollton, TX (US)

( * ) Notice: Subject to any disclaimer, the term of this patent is extended or adjusted under 35 U.S.C. 154(b) by 0 days.

(21) Appl. No.: 17/336,260

(22) Filed: Jun. 1, 2021

(65) Prior Publication Data
US 2022/0382540 A1 Dec. 1, 2022

(51) Int. Cl.
*G06F 8/71* (2018.01)
*G06F 8/75* (2018.01)

(52) U.S. Cl.
CPC . *G06F 8/71* (2013.01); *G06F 8/75* (2013.01)

(58) Field of Classification Search
CPC ..................................... G06F 8/71; G06F 8/75
See application file for complete search history.

(56) References Cited

U.S. PATENT DOCUMENTS

| | | | | |
|---|---|---|---|---|
| 6,199,204 B1* | 3/2001 | Donohue | ................... | G06F 8/65 717/178 |
| 7,620,948 B1* | 11/2009 | Rowe | ........................ | G06F 8/65 717/171 |
| 7,844,963 B2* | 11/2010 | Pitzel | ........................ | G06F 8/61 717/172 |
| 7,934,210 B1* | 4/2011 | Stampfli | .................... | G06F 8/61 717/174 |
| 7,975,020 B1* | 7/2011 | Green | ................ | G06Q 30/0241 705/26.1 |
| 8,949,817 B1* | 2/2015 | Le | ............................. | G06F 8/65 717/174 |
| 9,032,387 B1* | 5/2015 | Hill | ........................... | G06F 8/65 717/173 |
| 10,747,510 B1* | 8/2020 | Lundeen | ................... | G06F 8/44 |
| 10,761,835 B1* | 9/2020 | Koppel | ..................... | G06F 8/656 |
| 10,795,660 B1* | 10/2020 | Sundresh | .................. | G06F 8/48 |
| 2006/0130046 A1* | 6/2006 | O'Neill | .............. | G06F 9/30003 717/168 |
| 2007/0055766 A1* | 3/2007 | Petropoulakis | ..... | G06F 11/3006 709/224 |
| 2007/0089108 A1* | 4/2007 | Chen | ......................... | G06F 8/65 717/168 |
| 2015/0205598 A1* | 7/2015 | Lim | .......................... | G06F 8/65 717/170 |
| 2016/0004528 A1* | 1/2016 | Price | .......................... | G06F 8/65 717/173 |
| 2017/0039052 A1* | 2/2017 | Balachandran | ........... | G06F 8/71 |

(Continued)

*Primary Examiner* — Douglas M Slachta
(74) *Attorney, Agent, or Firm* — LOZA & LOZA, LLP; Richard Krukar

(57) ABSTRACT

In some aspects, a method for updating software using a rules engine is provided. The rules engine selects a handler for updating a non-updated string of code of a plurality of strings of code of a file and according to a set of rules. The set of rules associates the handler with updating a unique non-updated string of code. The rules engine also instructs the handler to scan the plurality of strings of code, identify, based on the scanning, the non-updated strings of code uniquely associated with the handler, and update the non-updated string of code. The rules engine further receives, from the handler, an indication that the non-updated string of code uniquely associated with the handler is an updated string of code. In addition, the rules engine generates for display on a display screen at least the updated string of code.

20 Claims, 33 Drawing Sheets

(56) References Cited

U.S. PATENT DOCUMENTS

| | | | | |
|---|---|---|---|---|
| 2017/0147324 A1* | 5/2017 | Weber | ............................ | G06F 8/48 |
| 2018/0196723 A1* | 7/2018 | Patil | ......................... | G06F 11/1471 |
| 2018/0307480 A1* | 10/2018 | Doyle | .......................... | G06F 8/658 |
| 2019/0196805 A1* | 6/2019 | Lee | ........................... | G06F 21/6209 |

\* cited by examiner

```
{ "lookup" : "session-rules",
  "commands" : [ {
    "insert" : [ {
       "object" : ("com.j2eeguys.updater.common.JDepScan",{
       "packagename": "com.sun.xml.xsom.impl.parser.state",
       "classname" : "NGCCHandler",
       "classver" : "",
```

/* unneeded information/details trimmed, including copyrights. */
class erset extends NGCCHandler {
    private string v;
    protected final NGCCRuntimeEx $runtime;
    private int $_ngcc_current_state;
    protected string $uri;
    protected string $localName;
    protected string $qname;

public final NGCCRuntime getRuntime() {
        return($runtime);
    } public erset(NGCCHandler parent, NGCCEventSource source, NGCCRuntimeEx runtime, int cookie) {
        super(source, parent, cookie);
        $runtime = runtime;
        $_ngcc_current_state = 1;
    } public erset(NGCCRuntimeEx runtime) {
        this(null, runtime, runtime, -1);
    }

/*Misc methods trimmed here*/ public void enterAttribute(String $__uri, String $__local, String $__qname) throws SAXException {
        int $ai;
        $uri = $__uri;
        $localName = $__local;
        $qname = $__qname;
        switch($_ngcc_current_state) {
        case 0:
        {
            revertToParentFromEnterAttribute(makeResult(),
                super._cookie, $__uri, $__local, $__qname);
```

```
        }
        break;
    default:
        {
            unexpectedEnterAttribute($__qname);
        }
        break;
    }
} public void leaveAttribute(String $__uri, String $__local, String
$__qname) throws SAXException {
    int $ai;
    $uri = $__uri;
    $localname = $__local;
    $qname = $__qname;
    switch($_ngcc_current_state) {
    case 0:
        {
            revertToParentFromLeaveAttribute(makeResult(),
super._cookie, $__uri, $__local, $__qname);
        }
        break;
    default:
        {
            unexpectedLeaveAttribute($__qname);
        }
        break;
    }
} public void text(String $value) throws SAXException {
    int $ai;
    switch($_ngcc_current_state) {
    case 0:
        {
            revertToParentFromText(makeResult(), super._cookie,
$value);
        }
        break;
    case 1:
        {
            v = $value;
            $_ngcc_current_state = 0;
        }
        break;
    }
}
```

FIG. 3B

```
public void onChildCompleted(Object $_result__, int $_cookie__,
boolean $_needAttCheck__)throws SAXException {
    switch($_cookie__) {
    }
} public boolean accepted() {
    return(($_ngcc_current_state == 0));
} private Integer makeResult() {
    if(v=="multi") return new Integer($runtime.finalDefault);

if(v.indexOf("#all")!=-1)
        return new Integer(XSType.EXTENSION|XSType.RESTRICTION);

int r = 0;

if(v.indexOf("extension")!=-1)    r|=XSType.EXTENSION;
    if(v.indexOf("restriction")!=-1)  r|=XSType.RESTRICTION;

return new Integer(r);
}

},"fileName":
"jaxb-ri/xsom/src/main/java/com/sun/xml/xsom/impl/parser/state/erset.ja
va",
"results":{
"uses deprecated method java/lang/Integer::<init>(I)V" : [ 0 ]
},
"fqdn" : "com.sun.xml.xsom.impl.parser.state.erset",
"out-identifier" : "com.sun.xml.xsom.impl.parser.state.erset",
"return-object" : true,
"entry-point" : "DEFAULT",
"disconnected" : false
},{
"fire-all-rules" : {
"max" : -1,
"out-identifier" : "firedActivations"
}
}]
```

FIG. 3C

```
<Message start>
Total found: 117
=====================================
key: "AX1UO1ihs0xSJ9YMQsCo"
rule: "squid:S2589"
severity: MAJOR
component:
  "com.j2eeguys.updater:projectupdater:reporter/src/main/java/com/j2eeguys
  /updater/reporter/UpdateReportLoader.java"
project: "com.j2eeguys.updater:projectupdater"
line: 234
textRange {
    startLine: 234
    endLine: 234
    startOffset: 8
    endOffset: 21
}
flows {
    locations {
        textRange {
            startLine: 234
            endLine: 234
            startOffset: 8
            endOffset: 21
        }
        msg: "Expression is always false."
        component:
          "com.j2eeguys.updater:projectupdater:reporter/src/main/java/com/j2eeguys
          /updater/reporter/UpdateReportLoader.java"
    }
    locations {
        textRange {
            startLine: 232
            endLine: 232
            startOffset: 101
            endOffset: 106
        }
        msg: "Implies \"costs\" can not be null."
```

FIG. 4A

```
    component:
    "com.j2eeguys.updater.projectupdater:reporter:reporter/src/main/java/com/j2eeguys
    /updater/reporter/UpdateReportLoader.java"
  }
  status: "OPEN"
  message: "Remove this expression which always evaluates to \"false\""
  debt: "10min"
  assignee: "Gorky"
  author: "steve@j2eeguys.com"
  tags: "based-on-misra"
  tags: "cert"
  tags: "cwe"
  tags: "redundant"
  creationDate: "2021-02-07T17:26:10-0600"
  updateDate: "2021-04-02T15:15:39-0500"
  type: CODE_SMELL
  effort: "10min"
  hash: "03d88ff560b591adf26621e3d30d03b2"
  fromHotspot: false
  29: "default-organization"
=================================================
<End Snippet>
```

```
begin sample Message Excerpt
    "object": {"com.j2eeguys.updater.common.JDepScan":{
    "packageName": "com.sun.xml.xsom.impl.parser.state",
    "className": "ErrSet",
    "classRef": {
    "results": {
      "Uses deprecated method java/lang/Integer::<init>(I)"
    }
  }
}
end sample Message Excerpt
```

FIG. 6

```
rule "java/lang/Integer::<init>(I)V"                                              ─ 702
when
    jds : JDepScan ( $items : results contains "uses deprecated method
java/lang/Integer::<init>(I)V" )
then
    final Logger logger = LoggerFactory.getLogger("drl.java.9");
    logger.info("Lvl: {} java/lang/Integer::<init>(I)V: {}", 1,
jds.getClassName());

jds.setInProgress("uses deprecated method
java/lang/Integer::<init>(I)V");
    update(jds);                                        ─ 702
    final UpdateHandler updater = new                         ─ 704
SimpleUpdater("java/lang/Integer::<init>(I)V",
        "new\\s+(?:java\\.lang\\.)?Integer\\(", "Integer.valueOf(");  ─ 706
    updater.handleRule(jds, "uses deprecated method
java/lang/Integer::<init>(I)V");
end
```

```
final SimpleUpdater updater = new
    SimpleUpdater("java/lang/Integer:<init>(I)V',
        "new\\s+(?:java\\.lang\\.)?Integer\\((%VAR%\\)",
        "(%VAR%\\)");
```

902
904 "Integer.
906 "Integer.valueOf\"

FIG. 9A

```
public class TestData {
int i = new java.lang.Integer(3);   // 932
//Do Stuff
int j = new Integer(4);              // 934
//Do More Stuff
int k = new Integer(var3);           // 936
int l = new Integer(VAR);            // 938
//Do EvenMore
}
```

```
public class TestData {
    int i = Integer.valueOf(3);   // 952
    //Do Stuff
    int j = Integer.valueOf(4);   // 954
    //Do More Stuff
    int k = Integer.valueOf(var3);  // 956
    int l = Integer.valueOf(VAR);   // 958
    //Do EvenMore
}
```

```
final SimpleApiUpdater updater = new
    SimpleApiUpdater("java/io/File::toURL()Ljava/net/URL;",
        "%VAR%.toURL(\\)", "%VAR%.toURI().toURL()");
```

1000 — arrow
1002 — SimpleApiUpdater("java/io/File::toURL()Ljava/net/URL;"
1004 — "%VAR%.toURL(\\)"
1006 — "%VAR%.toURI().toURL()"
1008 — File

FIG. 10A

```
File f = new File((String)parser.getArguments().get(0));
final InputSource in = new InputSource(f.toURL().toExternalForm());
```

```
f = new File((String)parser.getArguments().get(0));
final InputSource in = new InputSource(f.toURI().toURL().toExternalForm());
```

```
BigDecimal bd = new BigDecimal(probability);
bd = bd.setScale(5, BigDecimal.ROUND_HALF_UP);
```

1102 — BigDecimal bd = new BigDecimal(probability);
1104 — bd = bd.setScale(5, BigDecimal.ROUND_HALF_UP);

```
BigDecimal bd = new BigDecimal(probability);
bd = bd.setScale(5, RoundingMode.HALF_UP);
```

FIG. 11B

```
BigDecimal bd = new BigDecimal(probability);
bd = bd.setScale(5, 3);
```
1202 — BigDecimal bd
1204 — setScale(5, 3)

```
BigDecimal bd = new BigDecimal(probability);
bd = bd.setScale(5, RoundingMode.valueOf(3));
```

```
BigDecimal bd = new BigDecimal(probability);
bd = bd.setScale(5, getRoundingMode());
```

```
BigDecimal bd = new BigDecimal(probability);
bd = bd.setScale(5, RoundingMode.valueOf(getRoundingMode()));
```

1352 — BigDecimal
1354 — RoundingMode.valueOf(getRoundingMode())
1350

FIG. 13B

```
private Callback[] getCallbacks(final Object source) {
    final Class<?> type = source.getClass();
    final Field field = type.getDeclaredField("serialVersionUID");
    if (!field.isAccessible()) {
        field.setAccessible(true);
    }
    ...
}
```

```
private Callback[] getCallbacks(final Object source) {
    final Class<?> type = source.getClass();
    final Field field = type.getDeclaredField("serialVersionUID");
    if (!field.canAccess(source)) {
        field.setAccessible(true);
    }
    ...
}
```

```
Statement s = connection.createStatement();
s.execute("update name = '" + newUserName + "' where id = '" + userId);
```

```
final PreparedStatement ps = connection.prepareStatement("update name = ?
where id = ?");
ps.setObject(1, newUserName);
ps.setObject(2, userId);
ps.executeUpdate();
```

FIG. 15B

SOFTWARE UPDATER

TECHNICAL FIELD

The technology discussed below relates generally to software, and more particularly, for updating and modifying software.

BACKGROUND

Software developers implement new Long-Term Support (LTS) releases for software on a continual basis. An LTS may include a product lifecycle management policy in which a stable release of computer software is maintained for a longer period of time than the standard edition. An LTS may be typically reserved for open-source software, where the LTS describes a software edition that is supported for months or years longer than the software's standard edition. Each new LTS may include one or more new application programming interfaces (APIs). An API may be an interface that defines interactions between multiple software applications or mixed hardware-software intermediaries. An API may define the kinds of calls or requests that can be made, how to make them, the data formats that should be used, the conventions to follow. An API may also provide extension mechanisms so that users can extend existing functionality in various ways and to varying degrees.

In some aspects, a new LTS may not include one or more APIs that were included in a previous LTS. In other words, when creating a new LTS, one or more APIs from a previous LTS may be deleted. Thus, when code utilizing the deleted APIs is executed, that code may fail. Further, often, software support for a non-LTS version for software may be dropped as soon as a next version is released. While software support for an LTS may be longer, the LTS support may be limited to the most current LTS leaving previous LTSs without support. In some aspects, software developers may occasionally make coding errors resulting in performance, stability, and/or security failures. Additionally, or alternatively, some third-party libraries may release new versions on a routine basis. These new releases may have combination of new APIs, deleted old APIs, performance fixes, and security fixes.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some aspects, a rules engine is provided. The rules engine includes a memory. The rules engine also includes one or more processors in electronic communication with the memory. The one or more processors are configured to select one or more handlers for updating one or more non-updated strings of code of a plurality of strings of code associated with a file and according to a set of one or more rules. The set of one or more rules associates each of the one or more handlers with updating at least one unique non-updated string of code. The one or more processors are also configured to instruct at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler. The one or more processors are further configured to receive, from the at least one handler, an indication that the at least one non-updated string of code uniquely associated with the at least one handler is an updated string of code. In addition, the one or more processors are configured to generate for display on a display screen at least the updated string of code.

In some aspects, before selecting the one or more handlers, the one or more processors are further configured to receive, from a scanner, the plurality of strings of code associated with the file, wherein each of the plurality of strings of code comprise scanned strings of code, and identify the one or more non-updated strings of code of the plurality of strings of code. In some aspects, receiving, from the scanner, the plurality of strings of code associated with the file includes receiving, from the scanner, an indication of the one or more non-updated strings of code of the plurality of strings of code, and identifying the one or more non-updated strings of code of the plurality of strings of code is based on the indication. In some aspects, instructing the at least one handler of the one or more handlers to update the at least one non-updated string of code includes instructing the at least one handler to update at least one of a syntax of the non-updated string of code, a variable of the non-updated string of code, or an object of the non-updated string of code. In some aspects, instructing the at least one handler of the one or more handlers to update the at least one non-updated string of code includes instructing the at least one handler of the one or more handlers to update the at least one non-updated string of code from an initial version of the code to an updated version of the code. In some aspects, the updated version includes a version of the code immediately preceding the initial version of the code. In some aspects, the updated version includes a most recent version of the code.

In some aspects, a method implemented by a rules engine is provided. The method includes selecting one or more handlers for updating one or more non-updated strings of code of a plurality of strings of code associated with a file and according to a set of one or more rules. The set of one or more rules associates each of the one or more handlers with updating at least one unique non-updated string of code. The method also includes instructing at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler. The method further includes receiving, from the at least one handler, an indication that the at least one non-updated string of code uniquely associated with the at least one handler is an updated string of code. In addition, the method includes generating for display on a display screen at least the updated string of code.

In some aspects, a non-transitory, processor-readable storage medium of a rules engine is provided. The non-transitory, processor-readable storage medium has one or more computer executable instructions stored thereon. The one or more computer executable instructions that, when executed by a processing circuit, cause the processing circuit to select one or more handlers for updating one or more non-updated strings of code of a plurality of strings of code associated with a file and according to a set of one or more rules. The set of one or more rules associates each of the one or more handlers with updating at least one unique non-updated string of code. The one or more computer executable instructions that, when executed by the processing circuit, also cause the processing circuit to instruct at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler. The one or more computer executable instructions that, when executed by the processing circuit, further cause the processing circuit to receive, from the at least one handler, an indication that the at least one non-updated string of code uniquely associated with the at least one handler is an updated string of code. In addition, the one or more computer executable instructions that, when executed by the processing circuit, further cause the processing circuit to generate for display on a display screen at least the updated string of code.

In some aspects, a rules engine is provided. The rules engine includes means for selecting one or more handlers for updating one or more non-updated strings of code of a plurality of strings of code associated with a file and according to a set of one or more rules. The set of one or more rules associates each of the one or more handlers with updating at least one unique non-updated string of code. The rules engine also include means for instructing at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler. The rules engine further includes means for receiving, from the at least one handler, an indication that the at least one non-updated string of code uniquely associated with the at least one handler is an updated string of code. In addition, the rules engine includes means for generating for display on a display screen at least the updated string of code.

In some aspects, a handler is provided. The rules engine includes a memory. The rules engine also includes one or more processors in electronic communication with the memory. The one or more processors are configured to receive, from a rules engine, access to a plurality of strings of code associated with a file. The plurality of strings of code includes one or more non-updated strings of code. The one or more processors are also configured to scan the plurality of strings of code. The one or more processors are further configured to identify, based on scanning the plurality of strings of code, at least one non-updated string of code of the one or more non-updated strings of code uniquely associated with the handler. In addition, the one or more processors are configured to update the at least one non-updated string of code identified by the handler for display on a display screen. The one or more processors are also configured to transmit, to the rules engine, a first indication that the at least one non-updated string of code of the one or more non-updated strings of code uniquely associated with the handler is an updated string of code for display on the display screen.

In some aspects, the one or more processors are further configured to receive, from the rules engine, a second indication that the handler is of a set of at least one handlers selected for updating the at least one non-updated string of code of the one or more non-updated strings of code based on a set of one or more rules that associate each of the set of at least one handler with updating at least one unique non-updated string of code. In some aspects, in response to receiving the second indication, the one or more processors are further configured to scan the plurality of strings of code, identify, based on scanning the plurality of strings of code, the at least one non-updated string of code of the one or more non-updated strings of code uniquely associated with the handler, and update the at least one non-updated string of code identified by the handler for display on a display screen. In some aspects, updating the at least one non-updated string of code includes updating at least one of a syntax of the at least one non-updated string of code, a variable of the at least one non-updated string of code, or an object of the at least one non-updated string of code. In some aspects, updating the at least one non-updated string of code includes updating the at least one non-updated string of code from an initial version of the code to an updated version of the code. In some aspects, the updated version includes a version of the code immediately preceding the initial version of the code. In some aspects, the updated version includes a most recent version of the code.

In some aspects, a method implemented by a handler is provided. The method includes receiving, from a rules engine, access to a plurality of strings of code associated with a file, wherein the plurality of strings of code comprise one or more non-updated strings of code. The method also includes scanning the plurality of strings of code. The method further includes identifying, based on scanning the plurality of strings of code, at least one non-updated string of code of the one or more non-updated strings of code uniquely associated with the handler. In addition, the method includes updating the at least one non-updated string of code identified by the handler for display on a display screen. The method also includes transmitting, to the rules engine, a first indication that the at least one non-updated string of code of the one or more non-updated strings of code uniquely associated with the handler is an updated string of code for display on the display screen.

In some aspects, a non-transitory, processor-readable storage medium of a handler is provided. The non-transitory, processor-readable storage medium has one or more computer executable instructions stored thereon. The one or more computer executable instructions that, when executed by a processing circuit, cause the processing circuit to receive, from a rules engine, access to a plurality of strings of code associated with a file. The plurality of strings of code includes one or more non-updated strings of code. The one or more computer executable instructions that, when executed by the processing circuit, also cause the processing circuit to scan the plurality of strings of code. The one or more computer executable instructions that, when executed by the processing circuit, further cause the processing circuit to identify, based on scanning the plurality of strings of code, at least one non-updated string of code of the one or more non-updated strings of code uniquely associated with the handler. In addition, the one or more computer executable instructions that, when executed by the processing circuit, further cause the processing circuit to update the at least one non-updated string of code identified by the handler for display on a display screen. The one or more computer executable instructions that, when executed by the processing circuit, also cause the processing circuit to transmit, to the rules engine, a first indication that the at least one non-updated string of code of the one or more non-updated strings of code uniquely associated with the handler is an updated string of code for display on the display screen.

In some aspects, a handler is provided. The handler includes means for receiving, from a rules engine, access to a plurality of strings of code associated with a file. The plurality of strings of code includes one or more non-updated strings of code. The handler also includes means for scanning the plurality of strings of code. The handler further includes means for identifying, based on scanning the plurality of strings of code, at least one non-updated string of code of the one or more non-updated strings of code uniquely associated with the handler. In addition, the handler includes means for updating the at least one non-updated string of code identified by the handler for display on a display screen. The handler also includes means for transmitting, to the rules engine, a first indication that the at least one non-updated string of code of the one or more non-updated strings of code uniquely associated with the handler is an updated string of code for display on the display screen.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIG. 3A illustrates a conceptual example of a message output for updating code according to some aspects.

FIG. 3B illustrates a conceptual example of a message output for updating code according to some aspects.

FIG. 3C illustrates a conceptual example of a message output for updating code according to some aspects.

FIG. 4A illustrates a conceptual example of a static analysis scanner wrapper data message input according to some aspects.

FIG. 4B illustrates a conceptual example of a static analysis scanner wrapper data message input according to some aspects.

FIG. 6 illustrates a conceptual example of scanner wrapper message included with a project file according to some aspects.

FIG. 7 illustrates a conceptual example of a rule for use with a level one handler according to some aspects.

FIG. 8 illustrates a conceptual example of an updated project file according to some aspects.

FIG. 9A illustrates a conceptual example of a simple updater handler according to some aspects.

FIG. 9B illustrates a conceptual example of an input code to be updated by the simple updater handler 900 according to some aspects.

FIG. 9C illustrates a conceptual example of an output code previously updated by the simple updater handler 900 according to some aspects.

FIG. 10A illustrates a conceptual example of a level two API updater handler according to some aspects.

FIG. 10B illustrates a conceptual example of an input code to be updated by the simple API updater handler according to some aspects.

FIG. 10C illustrates a conceptual example of an output code previously updated by the simple API updater handler according to some aspects.

FIG. 11A illustrates a conceptual example of an input code for updating using a level three handler according to some aspects.

FIG. 11B illustrates a conceptual example of an output code after the input code is updated using the level three handler according to some aspects.

FIG. 12A illustrates a conceptual example of an input code for updating using a level three handler according to some aspects.

FIG. 12B illustrates a conceptual example of an output code after the input code is updated using the level three handler according to some aspects.

FIG. 13A illustrates a conceptual example of an input code for updating using a level three handler according to some aspects.

FIG. 13B illustrates a conceptual example of an output code after the input code is updated using the level three handler according to some aspects.

FIG. 14A illustrates a conceptual example of an input code for updating using a level four handler according to some aspects.

FIG. 14B illustrates a conceptual example of an output code after the input code is updated using the level four handler according to some aspects.

FIG. 15A illustrates a conceptual example of an input code for updating using a level five handler according to some aspects.

FIG. 15B illustrates a conceptual example of an output code after the input code is updated using the level four handler according to some aspects.

DETAILED DESCRIPTION

Figure 1:
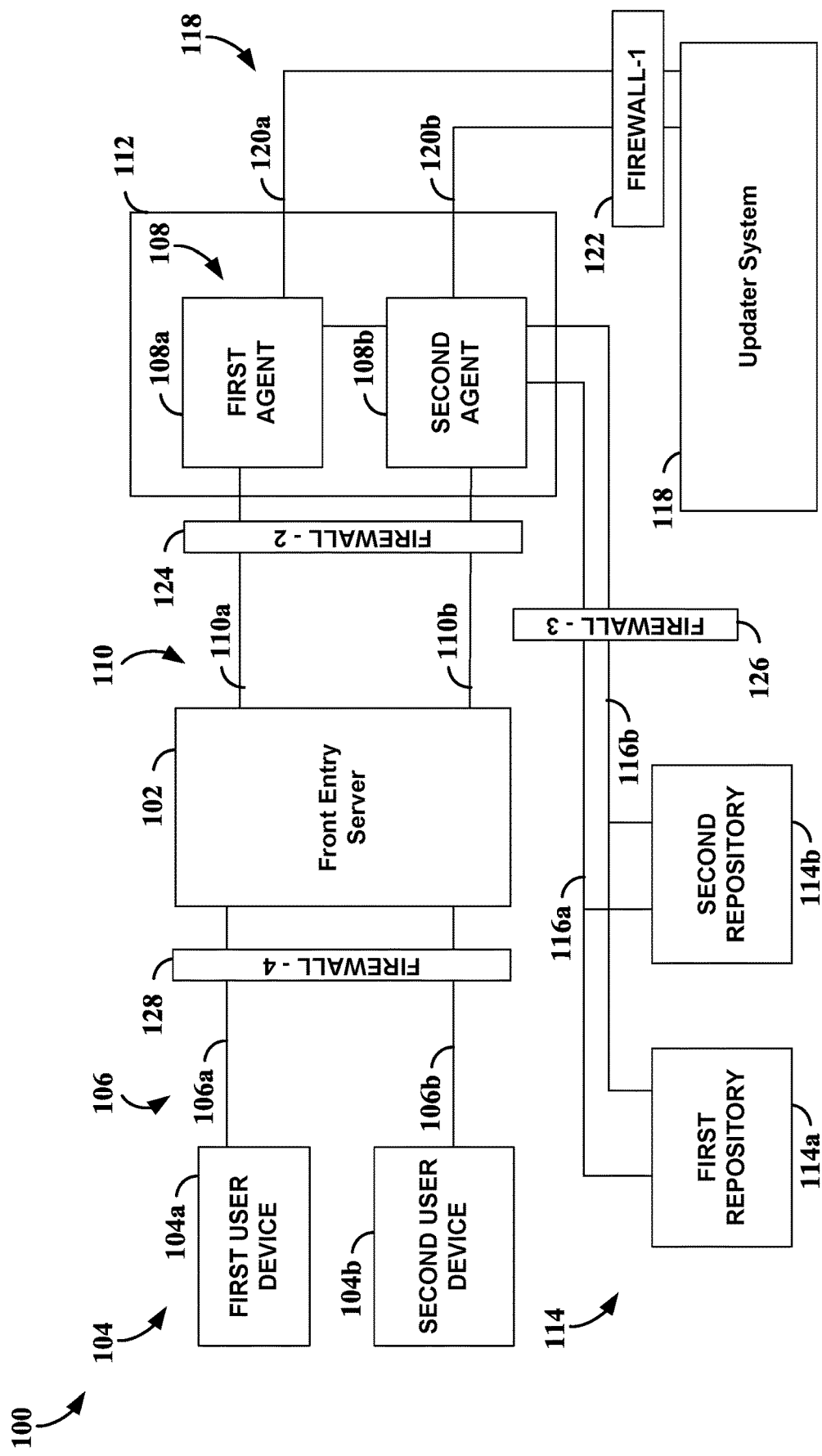
FIG. 1 is a conceptual diagram illustrating an example system for updating and modifying software according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Software developers implement new Long-Term Support (LTS) releases for software on a continual basis. An LTS may include a product lifecycle management policy in which a stable release of computer software is maintained for a longer period of time than the standard edition. An LTS may be typically reserved for open-source software, where the LTS describes a software edition that is supported for months or years longer than the software's standard edition. Each new LTS may include one or more new application programming interfaces (APIs). An API may be an interface that defines interactions between multiple software applications or mixed hardware-software intermediaries. An API may define the kinds of calls or requests that can be made, how to make them, the data formats that should be used, the conventions to follow. An API may also provide extension mechanisms so that users can extend existing functionality in various ways and to varying degrees.

In some aspects, a new LTS may not include one or more APIs that were included in a previous LTS. In other words, when creating a new LTS, one or more APIs from a previous LTS may be deleted. Thus, when code utilizing the deleted APIs is executed, that code may fail. Further, often, software support for a non-LTS version for software may be dropped as soon as a next version is released. While software support for an LTS may be longer, the LTS support may be limited to the most current LTS leaving previous LTSs without support. In some aspects, software developers may occasionally make coding errors resulting in performance, stability, and/or security failures. Additionally, or alternatively, some third-party libraries may release new versions on a routine basis. These new releases may have combination of new APIs, deleted old APIs, performance fixes, and security fixes.

In some aspects, software developers may determine which APIs have changed and may determine the APIs for replacement. Software developers may locate code for updating, determine how the code is to be updated, and implement the updates on the code. In some aspects, software development operations teams and/or software security operations teams may scan source code with static analysis tools, open tickets for located issues, triage with a software development team concerning located issues. Software development teams may identify faults, determine how to fix them, and implement the proper solutions. After the proper solutions are implemented, the software developers may perform a full regression test.

FIG. 1 is a conceptual diagram illustrating an example system 100 for updating and modifying software according to some aspects. As shown in FIG. 1, the system 100 may include a front entry server 102 communicatively coupled to one or more user devices 104 via one or more electronic communication channels 106. The one or more communication channels 106 may be communication channels utilized by the Internet. For example, a first user device 104a may be in electronic communication with the front entry server 102 via a first electronic communication channel 106a and a second user device 104b may be in electronic communication with the front entry server 102 via a second electronic communication channel 106b. The one or more user devices 104 may include at least one of a server, a computer, a handheld device, a combination thereof, or the like. In some aspects, the front entry server 102 may include a control bot such as a JENKINS™ control bot or a similar control bot. The front entry server 102 may provide the user interface for the system 100. For example, the front entry server 102 may include an HTTP interface for one or more web browsers, provide a status of one or more jobs, provide a control for one or more jobs (e.g., a task of executing one or more strings of code). The front entry server 102 may also provide triggers for stopping and/or starting one or more jobs. For example, the front entry server 102 may provide timing triggers to stop and/or start a job when one or more predetermined durations expire, when a particular time occurs, and/or when execution of code is initiated. As another example, the front entry server 102 may provide event triggers to stop and/or start one or more jobs upon the occurrence of an event. As yet another example, the front entry server 102 may provide control for running a flow of code (e.g., updater code) into and out of the system 100. For example, the one or more user devices 104 may communicate one or more strings of code to the system 100 for updating and/or modifying as described further herein. The front entry server 102 may control when and/or the rate at which the one or more strings of code are received for the system 100.

In some aspects, the front entry server 102 may include one or more configured users and one or more configured administrators. Each of the users and each of the administrators may be associated with individual humans and may provide a unique set of updating rights, project access rights, and/or security rights. For example, some administrators may have full access or limited access. Similarly, some users may have full access or limited access.

The system 100 may include one or more agents 108 such as at least a first agent 108a and a second agent 108b. As shown in FIG. 1, each of the first agent 108a and the second agent 108b may be communicatively coupled to the front entry server 102 via an agent communication channel such as a first agent communication channel 110a and a second agent communication channel 110b. In some aspects, an agent communication channel may include a secure shell (SSH) protocol communication channel. For example, the first agent 108a may be communicatively coupled to the front entry server 102 via a first agent communication channel 110a and the second agent 108b may be communicatively coupled to the front entry server 102 via a second agent communication channel 110b. An agent may be an independent computing system having one or more processors and memory, may reside in a secured zone 112 (e.g., a demilitarized zone (DMZ), a perimeter network, a screened subset), and include a software wrapper (e.g., a JAVA wrapper) for executing code received from the front entry server 102. For example, an agent may kick-off (e.g., execute) commands associated with received code as well as read data from and write data to the front entry server 102.

In some aspects, each individual agent may be in electronic communication via the internet within one or more repositories (e.g., GITHUB™, GITLAB™, repositories associated with GIT) such as a first repository 114a and a second repository 114b for accessing code. For example, the first agent 108a may receive one or more strings of code from the first repository 114a via a first repository communication channel 116a and/or the second repository 114b via a second repository communication channel 116b. As another example, the second agent 108b may receive one or more strings of code from the first repository 114a and/or the second repository 114b. Upon receiving the one or more strings of code, the first agent 108a may transmit the status of the one or more strings of code to the front entry server 102. The first agent 108a may also receive job control directions and/or one or more credentials from the front entry server 102. The one or more credentials may be used by the first agent 108a to push updates to one or more strings of code into the first repository 114a and/or the second repository 114b. Similarly, upon receiving the one or more strings of code, the second agent 108b may transmit the status of the one or more strings of code to the front entry server 102. The second agent 108b may also receive job control directions and/or one or more credentials from the front entry server 102. The one or more credentials may be used by the second agent 108b to push updates to one or more strings of code into the first repository 114a and/or the second repository 114b. In some aspects, at least one agent of the one or more agents 108 may be (e.g., include) an updater agent as described further herein.

The system 100 may also include a updater system 118. The updater system 118 may be electronically communicatively coupled to each of the one or more agents via one or more respective updater system communication channels. As shown in FIG. 1, the updater system 118 may be electronically communicatively coupled to the first agent 108a via a first updater system communication channel 120a and electronically communicatively coupled to the second agent 108b via a second updater system communication channel 120b. A first firewall 122 may be positioned along each of the one or more updater system communication channels. The first firewall 122 may be configured to permit a respective updater system to receive data and/or credentials originating only from the secured zone 112.

As described further herein, the updater system 118 may contain updater code and may be configured to update one or more non-updated strings of code of a plurality of strings of code associated with a file (e.g., a project file) and according to a set of one or more rules. The updater system 118 may also scan the plurality of strings of code, identify, based on scanning the plurality of strings of code, at least one non-updated string of code of the one or more non-updated strings of code, and update the at least one non-updated string of code. The updater system 118 may further be configured to generate for display on a display screen of the first user device 104a and/or the second user device 104b at least the updated string of code.

As described herein, the secured zone 112 may be defined by an area including the plurality of agents 108. In some aspects, the secured zone 112 may be defined by one or more firewalls located on communication channels feeding into and/or out of the plurality of agents 108. For example, the secured zone 112 may be define by the first firewall 122, a second firewall 124, and a third firewall 126. In some aspects, the secured zone 112 may be defined by one or more firewalls located on communication channels feeding into and/or out of the group including at least the front entry server 102 and the plurality of agents 108. For example, the secured zone 112 may be define by the first firewall 122, the third firewall 126, and a fourth firewall 128. In addition, the system 100 may be include a plurality of secured zones defined by at least one of the first firewall 122, the second firewall 124, the third firewall 126, or the fourth firewall 128. The updater system 118 may be within its own secured zone defined by the first firewall 122.

Figure 2:
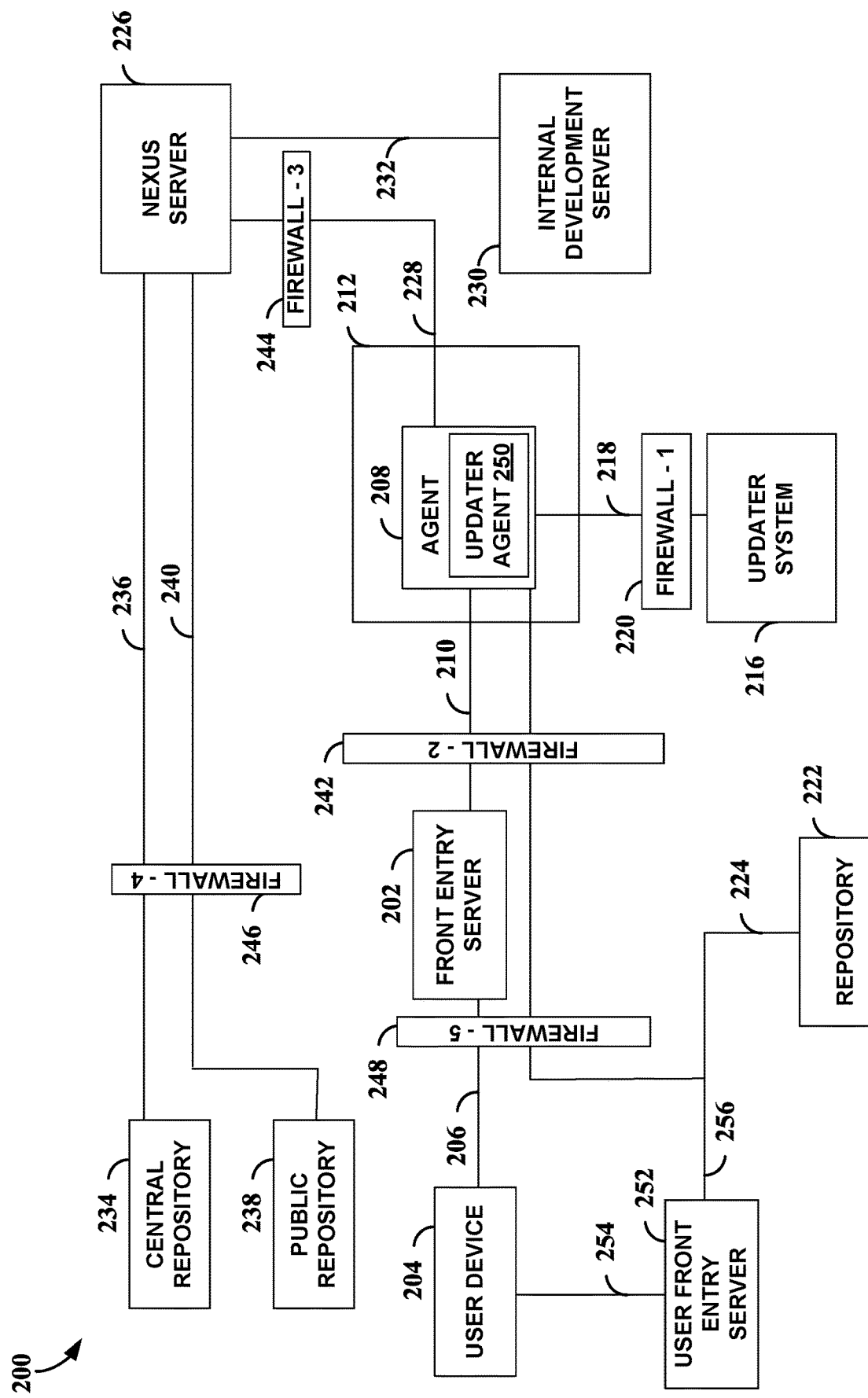
FIG. 2 is a conceptual diagram illustrating an example system for updating and modifying software according to some aspects.

FIG. 2 is a conceptual diagram illustrating an example system 200 for updating and modifying software according to some aspects. FIG. 2 may contain one or more elements/features of FIG. 1 including, for example, a front entry server 202 in electronic communication with a user device 204 via an electronic communication channel 206, one or more agents 208 residing in a secured zone 212 and in electronic communication with the front entry server 202 via an agent communication channel 210, and an updater system 216 (e.g., an updater engine) in electronic communication with the one or more agents 208 via an updater system communication channel 218 and a first firewall 220. A repository 222 may also be in electronic communication with the one or more agents 208 via a repository communication channel 224.

As shown in FIG. 2, the system 200 may also include a nexus server 226 in electronic communication with the one or more agents 208 via a nexus communication channel 228. The nexus server 226 is also in electronic communication with an internal development server 230 via an internal development server communication channel 232, a central repository 234 via a central repository communications channel 236, and a public repository 238 via a public repository communications channel 240. In some aspects, the internal development server 230 may include files from internal developers to execute the updater system 216. The files from the internal developers may include the scanners, wrapper binaries, and executable (e.g., external and/or third party wrapper scanners, custom wrapper scanners). The scanners receive an output from one or more deprecation scanners, wrap the output, and format the output for transmission to and use by the updater system 216. The output may be used for communication between the updater agent 250 and the updater system 216.

In some cases, upon receiving a project file containing one or more files each with one or more strings of code, the one or more agents 208 may scour servers and databases throughout the internet to identify one or more secondary files for building the project file. However, rather than relying on servers and databases throughout the internet to identify the one or more secondary files, the one or more agents 208 may rely on the nexus server 226. In some aspects, the nexus server 226 may include binaries (e.g., bits for computer execution), code and indexes of public repositories, scanner binaries/executables, and the like. The one or more agents 208 may use the binaries rather than source code to scan one or more strings of code in a project file. In some aspects, the one or more user devices 204 may have access (e.g., limited access) to the nexus server 226. However, unlike the one or more agents 208, the one or more user devices 204 may be unable to access (e.g., restricted from accessing) the scanner binaries contained in the nexus server 226.

In some aspects, the nexus server 226 may transmit an inquiry to the one or more agents 208 for receiving information related to obtaining one or more secondary files for building a project file. Additionally, or alternatively, the one or more agents 208 may transmit information to the nexus server 226 related to obtaining one or more secondary files for building a project file. The nexus server 226 may receive an indication of one or more build files for obtaining one or more secondary files to build the project file. In some aspects, the nexus server 222 may be configured to determine one or more secondary files associated with the one or more build files identified in the indication. For example, an one or more agents 208 may generate a workspace for using (e.g., executing) compiled code and source code. Generally, the workspace may include one or more of source files of the project file, build files (e.g., build scripts), third party libraries (e.g., libraries for the logging subsystem), and a generator to build project artifacts. The one or more agents 208 may receive a project file (e.g., an open source project having files with open source code, one or more private or corporate projects, or the like) having one or more files each with one or more strings of code from the repository 222 via the repository communication channel 224. The one or more agents 208 may insert the project file having the one or more files each with one or more strings of code into the workspace.

It should be understood that, in some aspects, each of the one or more user devices 204 may be associated with an individual user front entry server 252. As shown in FIG. 2, the one or more user devices 204 are in electronic communication with a respective user front entry server 252 via a front entry server communication channel 254. The user front entry servers 252 may be in electronic communication with the repository 222 via a repository bridge communication channel 256 and the repository communication channel 224. Each of the user front end servers 252 may have one or more features of the front entry server 202 and/or the front entry server 102 illustrated in FIG. 1. For example, a user device 204, using the user front entry server 252, may be able to access binaries from the nexus server 226 and/or the data from the repository 222. As another example, when the updater agent 250 pushes updated code to the repository 222, the user front entry server 252 may initiate its own builds, scans, and quality control checks.

The one or more agents 208 may then execute a build on the project file. For example, the one or more agents 208 may utilize one or more build files from the project file and execute the build files to build the project file. When building the project file, the one or more agents 208, using at least one build file, may instruct the nexus server 226 to obtain one or more secondary files that may be needed to build the project file. The nexus server 226 may determine which secondary files are needed to build the project file and may obtain the secondary files from the central repository 234 via the central repository communication channel 236 and the public repository 238 via the public repository communication channel 240. Upon receiving the one or more secondary files determined by the nexus server 226 to build the project file, the nexus server 226 may store the one or more secondary files for subsequent access and/or use.

Contemporaneously with the one or more agents 208 building the project file, the one or more agents 208 may also be scanning each of the one or more strings of code within each file of the project file. For example, when building the project file, the one or more agents 208 may request that the nexus server 226 provide the one or more agents 208 with one or more scanners generated by the internal development server 230 executing one or more internal development processes. The nexus server 226 may receive a plurality of scanners from the internal development server 230 via the internal development server communication channel 232 and store the plurality of scanners in a repository of the nexus server. The nexus server 226 may identify one or more scanners of the plurality of scanners that are suitable for the project file and provide the one or more scanners to the one or more agents 208 for scanning. Concurrently, the front entry server 202 may be monitoring the building and scanning of the project file and reporting a build status and/or a scanning status of the project file for display on a display screen of the user device 204. A build status may include identifying one or more stages for updating code and/or one or more remaining times for completing one or more tasks or projects.

After the one or more agents 208 scan each of the one or more strings of code in each file of the project file, the one or more agents 208 may transmit the project file to the updater system 216 for updating one or more non-updated strings of code within the project file as described herein. After the updating of the one or more non-updated strings of code is executed by the updater system 216, the one or more agents 208 may receive the project file with the updated strings of code and write the updated project file into the workspace for execution and/or display on a display screen of the user device 204. In some aspects, the one or more agents 208 may push the updates to the repository 222 via the repository communication channel. In some aspects, before the one or more agents 208 push the project file with the updates to the repository 222, the one or more agents 208 may re-execute the build of the project file and execute one or more tests of the project file.

With the one or more agents 208 scanning the project file before sending the project file to the updater system 216, the processing time and power utilized by the updater system 216 for updating one or more non-updated strings of code in the project file to one or more updated strings of code in the project file is greatly reduced because the updater system 216 as well as other devices working in cooperation with the updater system 216 as described herein can reduce a quantity of scans need to perform updating. It should be understood while the description contains an example one or more agents 208 executing a build and scan on one project file, one having ordinary skill in the art would understand that the one or more agents 208 may execute a build and scan on a plurality of project files. For example, the one or more agents 208 may include one or more processors that can be throttled to account for building and scanning a single project file or multiple project files as well as to increase or decrease the throughput of the one or more agents 208.

As described herein, the secured zone 212 may be defined by an area including the one or more agents 208. In some aspects, the secured zone 212 may be defined by one or more firewalls located on communication channels feeding into and/or out of the one or more agents 208. For example, the secured zone 212 may be define by the first firewall 220, a second firewall 242, and a third firewall 244. In some aspects, the secured zone 212 may be defined by one or more firewalls located on communication channels feeding into and/or out of the group including at least one of the front entry server 202, the one or more agents 208, the nexus server 226, and the internal development server 230. For example, the secured zone 212 may be define by the first firewall 220, the fourth firewall 246, and a fifth firewall 248. In addition, the system 100 may include a plurality of secured zones defined by at least one the first firewall 220, the second firewall 242, the third firewall 244, the fourth firewall 246, or the fifth firewall 248. The updater system 216 may be within its own secured zone defined by the first firewall 220.

In some aspects, the one or more agents 208 may include an updater agent 250.

The updater agent 250 may be a client of the updater system 216. The updater agent 250 may be configured to determine which scanners to invoke, invoke one or more appropriate mapping wrappers used to invoke an appropriate scanner, collate the results of the scanners for the updater system 216, connect to and upload results produced by the scanners to the updater system 216, receive the updated files (if any, including but not limited to code) from the updater system 216 and writes/saves the updates to the appropriate source files, and invoke a reporter to write out the activity report, including billing costs (if any) for processing. The updater agent 250 may be controlled by configuration files and command line options. Wrappers be used that allow the updater agent 250 to be plugged into various build systems such as MAVEN™ (implemented) and GRADLE™ (designed enhancement).

The updater agent 250 may also scan each of the one or more strings of code within each file of the project file using one or more scanners. For example, when building a project file, the updater agent 250 may request that the nexus server 226 provide the updater agent 250 with one or more scanners generated by the internal development server 230 executing one or more internal development processes. The nexus server 226 may receive a plurality of scanners from the internal development server 230 via the internal development server communication channel 232 and store the plurality of scanners in a repository of the nexus server. The nexus server 226 may identify one or more scanners of the plurality of scanners that are suitable for the project file and provide the one or more scanners to the updater agent 250 for scanning. The nexus server 230 may have or may retrieve a plurality of scanners each associated with a different task or focus. Each of the scanners may include a mapping wrapper that converts the output of the respective scanner into a format suitable for parsing and action by the updater system 216. The scanner wrappers may be managed by the updater agent 250 which collates the output from the scanner wrappers and any additional data such as source code and build files.

Generally, scanners may by supplied by a third parties, such as ORACLE®, OPENJDK™, SONAR SOURCE™, and the like. In some aspects, scanners, for example, for GRADLE™ build files, MAVEN™ build files, and ANT™ build files, may be written by independent or separate software development teams. In some aspects, the scanners may include a deprecation scanner (e.g., a JAVA™ deprecation scanner). A deprecation scanner may include a combination of the development kit tool (e.g., JAVA™ Development Kit (JDK) tool 'jdeprscan') and the associated mapping wrapper. In some aspects, the mapping wrapper may be calibrated for an Open development kit tool.

A deprecation scanner may be configured to search compiled files (e.g., JAVA™ files) for invocations to classes, methods, and properties that have been deprecated from the source of the files (e.g., JAVA™). The deprecation scanner may then report issues found to the invoker. The deprecation scanner mapping wrapper may invoke the deprecation scanner (e.g., "jdeprscan"), format the output of the scanner into a format that can be parsed by the updater system 216 via a processor scanparser (e.g., jdepProcessor ScanParser), and locate and attach the one or more source files identified by the scanner to the data package for sending to the updater system 216.

FIGS. 3A, 3B, and 3C illustrate a conceptual example of a message output 300 for updating code according to some aspects. The message output 300 may be a message transmitted from the updater agent 250 to the updater system 216 (e.g., a rules engine of the updater system 216). The portion of the message output 300 shown in FIG. 3A may contain details associated with the code file to be updated and/or modified and a portion of the code file to be updated and/or modified. The portion of the message output 300 shown in FIG. 3B may contain details associated with the code file to be updated and/or modified. The portion of the message output 300 shown in FIG. 3C may contain a portion of the code file to be updated and/or modified, a filename and directory entry of the code file to be updated and/or modified, a name of the code file being updated and/or modified, a collected list of issues identified by the various scanners (e.g., "results"), and various operational information for operation of the updater system 216 (e.g., a rules engine of the updated system 216. In some aspects, the message output 300 may be from an open source project, such as an OpenSource JAXB-RI project. The open source project may include "class com/sun/xml/xsom/impl/parser/state/ersSet uses deprecated method java/lang/Integer::<init>(I)V" and output to the updater system 216 from the updater agent 250 of FIG. 2. In some aspects, data and relationships stored in memory may be converted into a json format suitable for transmission from the updater agent 250 over a network connection (e.g., the updater system communication channel 218 of FIG. 2) for reception by the updater system 216.

In some aspects, the one or more scanners may include a static analysis scanner. The static analysis scanner may include an associated mapping wrapper. The static analysis scanner may be configured to cause the updater agent 250 to download rules and configurations from a static analysis server, scan the code for violations of the rules and initial processing, and send the results including project source code to a static analysis engine for additional processing, storage, and eventual review by the system users (Software Developers, Managers, Q/A Testers, Automated Systems such as Jenkins/Travis/Spinnaker, etc.). In some aspects, the static analysis scanner may be the SONARQUBE™ scanner or, alternatively, a comparable scanner. In some aspects, the deprecation scanner wrapper code 300 may include an output deprecation scanner wrapper code.

FIGS. 4A and 4B illustrate a conceptual example of a static analysis scanner wrapper data message input 400 according to some aspects. In some examples, the static analysis scanner wrapper data message input 400 may be at least one of a SONARQUBE™ scanner wrapper, a JLINT™ scanner wrapper, and/or a LINT™ scanner wrapper. In some aspects, the static analysis scanner wrapper data message input 400 may invoke the static analysis scanner and subsequently query a static analysis scanner server for the "decorated" scan results. The "decorated" scan results may be sent to the updater system 216 from the updater agent 250 of FIG. 2. In some aspects, data and relationships stored in memory may be converted into a format suitable for transmission over a network connection (e.g., the updater system communication channel 218 of FIG. 2) for reception by the updater system 216. The static analysis scanner wrapper data message input 400, after being received by the static analysis wrapper, may be parsed and mapped into a same or similar format as shown with respect to the message output 300 illustrated in FIGS. 3A, 3B, and 3C.

In some aspects, the one or more scanners may include an update scanner. In some aspects, the update scanner may be a MAVEN™ update scanner. The update scanner may be configured to update a project file's third party library dependencies to a current version of the third party libraries. For example, the update scanner may be configured to update (e.g., upgrade) a project file from a spring v4 to a spring v5, a struts v2 to a struts v3, or the like. Various projects (e.g., open source projects) may be routinely releasing updates for various reasons, including security, performance, stability, and the like. In some aspects, the update scanner may be configured to cause the updater agent 250 to scans build pom.xml files (e.g., MAVEN™ build pom.xml files) to determine the project's dependencies. The update scanner may also cause the updater agent 250 to send a list of dependencies to the updater system 216 for determining which dependencies are out-of-date. In some aspects, the update scanner may cause the updater agent 250 to receive a list of out-of-date dependencies from the updater system 216 and scan the compiled class files for usage of the out-of-date dependencies. In addition, in some aspects, the update scanner may be configured to cause the updater agent 250 to send the source code with the references to the out-of-date references and the out-of-date pom.xml(s) to the updater system 216 to determine and apply the appropriate updates.

In some aspects, the one or more scanners may include an upgrade scanner. In some aspects, the upgrade scanner may be a MAVEN™ upgrade scanner. In some aspects, the MAVEN™ upgrade scanner may be used to convert a project file from a MAVEN™ build system to a GRADLE™ build system. In some aspects, the MAVEN™ upgrade scanner may be an upgrade/improvement from a Make & Ant upgrade scanner. The upgrade scanner may be configured to cause an agent 208 (e.g., an upgrader agent) to address dependency management of third party library issues of certain build systems (e.g., Make & Ant build systems). In some aspects, an upgrade scanner may be associated with standard project directory layouts.

In some aspects, the update scanner may be configured to cause the agent 208 to update a project's third-party library dependencies to current versions of a third-party libraries. In some aspects, the update scanner may be a GRADLE™ update scanner. The update scanner may be configured to cause the agent 208 to update a project from spring v4 to spring v5, struts v2 to struts v3, and/or the like. Various projects (e.g., open source projects) may be routinely releasing updates for various reasons, including security, performance, stability, and the like. In some aspects, the update scanner may be configured to cause the agent 208 to scan build files (e.g., one or more GRADLE™ build.gradle files) to determine the project's dependencies. The update scanner may also cause the agent 208 to send a list of dependencies to the updater system 216 for determining which dependencies are out-of-date. In some aspects, the update scanner may cause the agent 208 to receive a list of out-of-date dependencies from the updater system 216 and scan the compiled class files for usage of the out-of-date dependencies. In addition, in some aspects, the update scanner may be configured to cause the agent 208 to send the source code with the references to the out-of-date references and the out-of-date build files to the updater system 216 to determine and apply the appropriate updates.

In some aspects, in addition to APIs being deprecated and eventually deleted from code (e.g., JAVA™ language), new APIs may be routinely added. For example, a hashmap API may be added as a faster version of a hashtable API, for-each as a more efficient for-loop, lambdas for faster performing code, or the like. An upgrade scanner (e.g., a JAVA™ upgrade scanner) may be configured to cause the agent 208 to identify areas where new language syntax can be used to update code that was initially created using older styles. In some aspects, JAVA™ and related technologies were selected due to the expertise of the Main Coder as well as ORACLE™'s decision to release a new version of JAVA™ approximately every six (6) months that was not completely backwards compatible with previous versions of JAVA™. However, various scanners are already available for other languages, both for API deprecation as well as security and stability issues. SONARQUBE™ may supports multiple languages that can be easily handled by the agent 208 and the updater system 216.

Figure 5:
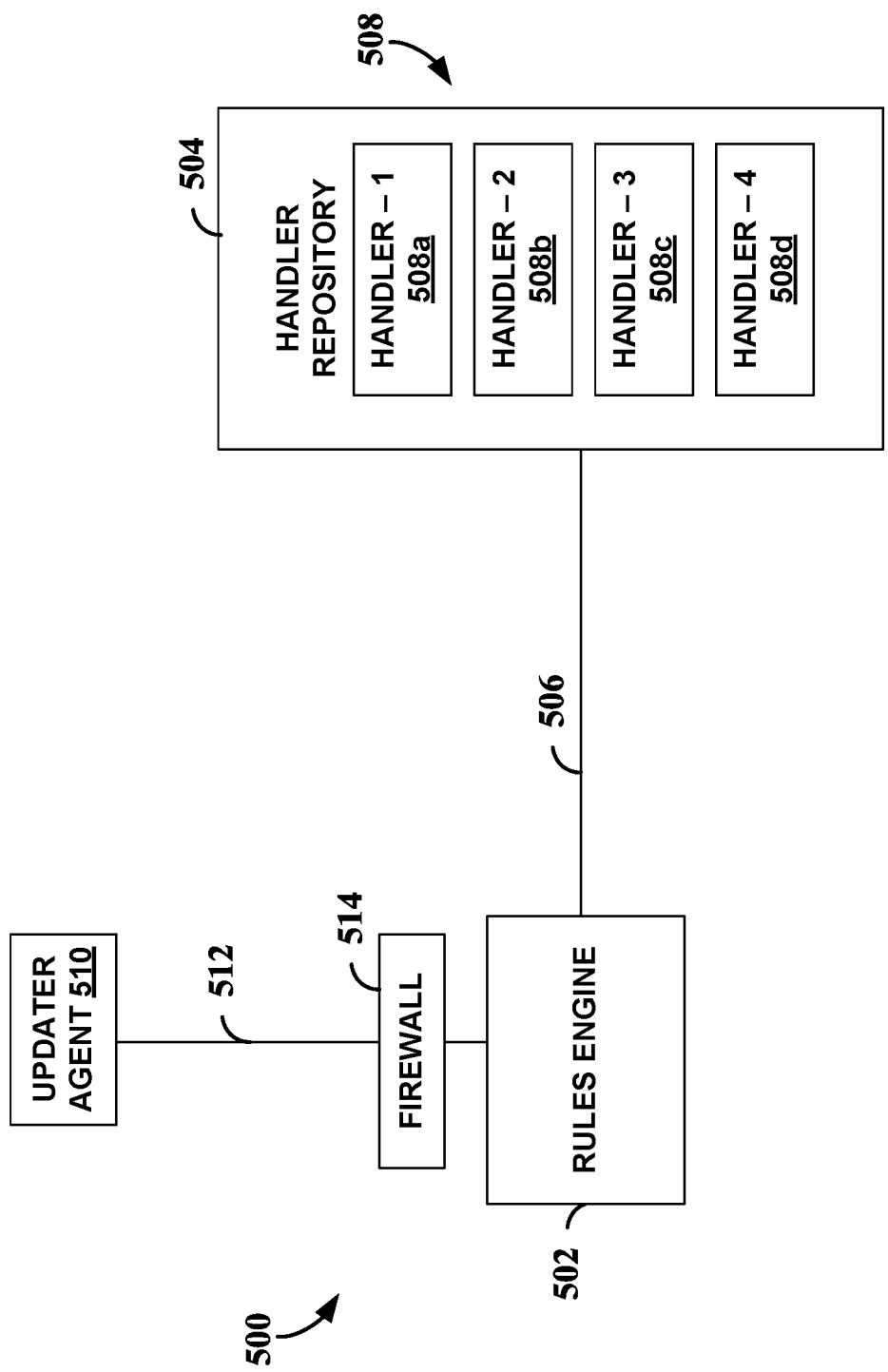
FIG. 5 illustrates an example updater system according to some aspects.

FIG. 5 illustrates an example updater system 500 according to some aspects. The updater system 500 may include one or more same or similar features as the updater system 118 illustrated in FIG. 1 and/or as the updater system 216 illustrated in FIG. 2. As shown in FIG. 5, the updater system 500 may include at least one rules engine 502 and a handler repository 504 in electronic communication with the rules engine 502 via a handler repository communication channel 506. The handler repository 504 may include a plurality of handlers 504. For example, the plurality of handlers may include a first handler 508a, a second handler 508b, a third handler 508c, and a fourth handler 508d. In some aspects, the updater system 500 may also include an updater agent 510 in electronic communication with the rules engine 502 via an updater system communication channel 512 and a firewall 514. The updater agent 510 may be the same as or at least similar to the agent 208 of FIG. 2, the updater agent 250 of FIG. 2, the first agent 108a of FIG. 1, and/or the second agent 108b of FIG. 1. The updater system communication channel 512 may be the same as or at least similar to the updater system communication channel 218 of FIG. 2 and/or the updater system communication channel 120b of FIG. 1. The firewall 514 may be the same as or at least similar to first firewall 220 illustrated in FIG. 2 and/or the first firewall 122 of FIG. 1.

In some aspects, the rules engine 502 may be a multi-core processor and include a 16 gigabytes (GB) or more base system random access memory (RAM). The updater agent 510 may include a staging system having a multi-core threading system and one (1) GB or more of RAM. In some aspects, the rules engine 502 may be deployed in a cloud network. The rules engine 502 may be configured to select one or more handlers 508 for updating one or more non-updated strings of code of a plurality of strings of code associated with a file (e.g., a project file) and according to a set of one or more rules. For example, the rules engine 502 may receive a consolidate a project file (e.g., a consolidated output) from the updater agent 510. The project file may be wrapped and collated from one or more scanner, described herein. Additional information about the customer owning the project may be loaded from an enterprise resource planning (ERP) system.

The rules engine 502 may be configured to receive one or more strings of code of a project file. The one or more strings of code may include one or more non-updated strings of code. Upon receiving the one or more strings of code, the rules engine 502 may select one or more handlers for updating the one or more non-updated strings of code. The rules engine 502 may select the one or more handlers 508 for updating the one or more non-updated strings of code using one or more scanner wrapper messages having one or more rules included in the project file. For example, before selecting one or more handlers 508, the rules engine 502 may receive, from a scanner, a plurality of strings of code associated with the project file. Each of the plurality of strings of code may include scanned strings of code each having one or more scanner wrapper messages containing one or more rules associating each of the one or more handlers 508 with updating at least one unique non-updated string of code. The scanned strings of code may enable the rules engine 502 to identify the one or more non-updated strings of code of the plurality of strings of code for updating. In some aspects, the rules engine 502 may receive, from the scanner, the plurality of strings of code associated with the project file may include that the rules engine 502 receives, from the scanner, an indication of the one or more non-updated strings of code of the plurality of strings of code and identifies the one or more non-updated strings of code of the plurality of strings of code based on the indication.

FIG. 6 illustrates a conceptual example of scanner wrapper message 600 included with a project file according to some aspects. As shown in FIG. 6, the scanner wrapper message 600 contains a plurality of field names 602. A first field 604, named "classDef", may identify the contents of the source file or project file. A second field 606, named "results", may provide a collated list of parsed output from one or more of the various scanners and may include additional details for processing. A third field 608, named "resultsentry", may indicate that the second field 606 (named "results") may have one or more results entry. Each entry may have additional data included in a fourth field 610 associated with the entry. A value of the results entry may be matched by the rules engine 502 to determine which handler of the plurality of handlers 508 is to be invoked. The scanner wrapper message 600 may also include additional fields. Those additional fields may be used for a communications layer for re-assembling the internal data objects for processing (third-party libraries, primarily conversion libraries (e.g., primarily JSON conversion libraries used by DROOLS™), and the like), for determining by the updater agent 510 which source files to write the updated output back to, DROOLS™ for internal processing and handling by a DROOLS™, reporting systems, billings systems, and the like. While the above description provides for a DROOLS™ system, it should be understood that the DROOLS™ system is merely an example system implemented by or contained within a rules engine 502 and that other same or similar systems may be additionally or alternatively implemented or used.

Upon receiving the project file from the updater agent 510, the rules engine 502 may use configured rules to determine which one or more handlers 508 should be invoked on which source files of the project file, when each of the one or more handlers 508 may be invoke, and the order by which each of the one or more handlers 508 are to be invoked. In some aspects, the rules engine 502 may select each handler 508 on a per-rule/handler basis. In some aspects, a rule may trigger multiple handlers. In some aspects, a selected (e.g., invoked) handler may invoke additional handlers. In some aspects, rules may also setup conditions for other rules to be invoked when the handling of a given rule has completed. The rules engine 502 may provide information for each handler during selection including results that cause the invocation of the handler, a name of the rule that was invoked, a source file to be modified, and the like. In some aspects, the rules engine 502 may also provide information for a billing system during selection of each handler including the one or more rules that were invoked, the one or more handlers that were selected, a number of instances that were updated by the handler, a project file name that the updater system 500 was processing, a source file name, a level of effort for each selected handler, and the like.

FIG. 7 illustrates a conceptual example of a rule 700 for use with a level one handler according to some aspects. The rule 700 may be used to select one or more handlers of the plurality of handlers 508 for updating one or more strings of code of a project file. In some aspects, the rule 700 may be used with a level one handler. As shown in FIG. 7, the rule 700 may include a rule name 702 (e.g., "java/lang/Integer::<init>(I)V"), a search string 704 (e.g., "news\\s+(?:java\\.lang\\.)?Integer\\(") such as a regular expression (RegEx) based stylized search string, and a replacement string 706 (e.g., "Integer.valueOf") such as a stylized replacement string.

The rules engine 502 may also be configured to instruct at least one handler 508 of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler For example, the plurality of handlers 508 may comprise a variety of different handlers. In some aspects, one or more handlers may include a core/base handler API such as a rule action handler ("core handler"). Core handlers may handle the updates to the project file's source code. Core handler may update one or more strings of code of the project file according to one or more rules determined by the rules engine 502. The core handlers are typically invoked by an action section of a triggered rule by the rules engine 502, although the core handlers may additionally or alternatively be invoked by other handlers. In some aspects, the one or more handlers may include an update interface handler. Update interface handlers provide a consistent API for accessing a group of disparate classes that may be used for providing solutions to a particular problem set. The update interface handler may define one or more methods that all core handlers invoked by the rules engine 502 need to implement. In some aspects, the rule engine 502 instructing the at least one handler 508 of the one or more handlers to update the at least one non-updated string of code may include instructing the at least one handler 508 to update at least one of a syntax of the non-updated string of code, a variable of the non-updated string of code, or an object of the non-updated string of code.

In some aspects, upon receiving the instruction from the rules engine 502, one or more of the handlers 508 may receive, from a rules engine, access to a plurality of strings of code associated with a file, where the plurality of strings of code may include the one or more non-updated strings of code. The one or more handlers 508 may also scan the plurality of strings of code, identify, based on scanning the plurality of strings of code, at least one non-updated string of code of the one or more non-updated strings of code uniquely associated with the handler, and update the at least one non-updated string of code identified by the handler for display on a display screen. For example, when a core handler receives an invocation from the rules engine 502 to update one or more strings of code of a project file (e.g., source code of a project file), the core handler may receive one or more target parameters and one or more scanned results parameters. The one or more target parameters may include one or more objects representing the source code file being processed and may include the contents of the source code file. The one or more scanned results parameters may include the parsed and decorated output message from a scanner. The one or more scanned results parameters may be used as the "lookup key" to determine which rule is being processed and any associated information from the scanner and the source file. In some aspects, the core handler may return nothing as the update target includes applicable updates that are applied.

In some aspects, the rules engine 502 instructing the at least one handler of the one or more handlers to update the at least one non-updated string of code may include that the rules engine 502 instructs the at least one handler of the one or more handlers to update the at least one non-updated string of code from an initial version of the code to an updated version of the code. For example, the initial version of code may be a previous version of the code (e.g., a version of code that is not the most recent version of code) and the updated version of the code may be a most recent version of the code. In some aspects, the updated version of the code may be a version of code that is the immediate next version of code from the initial version of the code.

In some aspects, update handlers may share certain basic functionality with each other. An abstract updater (e.g., an abstract updater class) may be used a shared "base" Class (e.g., standard OOP Principals) defined with the shared/common functionality. In some aspects, an abstract updater constructor may be used and only accessed by child/implementing classes, thus, having a protected scope. To update code, the abstract updater constructor may use a rule parameter (e.g., a string), and a difficulty parameter (e.g., indicated by an integer), a search string parameter, and a replacement string parameter. The rule parameter may be used for logging purposes and may include a name of the rule being handled. The difficulty parameter may include the difficulty of the rule being processed, and may be defined either by the rule engine 502 or at a specific handler level. The search string parameter may include a stylized regex that may be converted to a JAVA™ regex for searching targeted source files for the source code that needs to be modified. Stylization may include locations where variables that must be used in the replacement code are located. The replacement string parameter may include stylized code-strings used to replace the selected source code. Stylization may include locations where variables read from the selected code are to be inserted.

An abstract updater build search string handler may convert stylized search strings to a regular expression (e.g., JAVA™ regex) string capable of selecting any defined variables or method calls from the selected text/code in the search source file. To update code, the abstract updater build search string handler may use a search string (string) parameter and a code type only (JAVA™ only) (boolean) parameter. The search string (string) parameter may include a stylized search string to build a pattern object (e.g., a regex pattern object, a JAVA™ regex pattern object) used for searching source files. The code type only (boolean) parameter may include an indication of whether or not only characters valid in the code type (e.g., JAVA™ identifiers) are allowed. The code type only parameter may be used when searching for identifiers such as variable names or class names. The abstract updater build search string handler may return a regular expression (e.g., JAVA™ RegEx) that can be used to build a pattern object for scanning and selecting source code from a source file.

An abstract updater build search pattern handler may convert stylized search strings to a regular expression (e.g., JAVA™ regex) pattern object capable of selecting any defined variables or method calls from the selected text/code in the search source file. To update code, the abstract updater build search pattern handler may use a search string (string) parameter and a code type only (JAVA™ only) (boolean) parameter. The search string (string) parameter may include a stylized search string to build a pattern object (e.g., a regex pattern object, a JAVA™ regex pattern object) used for searching source files. The code type only (boolean) parameter may include an indication of whether or not only characters valid in the code type (e.g., JAVA™ identifiers) are allowed. The code type only parameter may be used when searching for identifiers such as variable names or class names. The abstract updater build search pattern handler may return a code type only pattern object (e.g., a JAVA™ pattern object) for scanning and selecting source code from a source file.

An abstract updater get customer information handler may load billing and other details for a project being processed. To update code, the abstract updater get customer information handler may not include any parameters. Pertinent information such as a customer's lookup code may be loaded from a handler state. An abstract updater handle rule handler may be an implementation of update handler handle rule and may be defined in the updater handler interface. The abstract updater handle rule handler may set the handler's state as appropriate pre-handling and post-handling. Also, the abstract updater handle rule handler may store the updated source code text in the target when appropriate. An abstract updater do handle rule handler may be an API that an implementing sub/child class is to implement. The child implementations may handle the actual updates to the source code. The abstract updater do handle rule handler may include a scan results parameter that may be a parsed and decorated output message from the scanner. The message may be used as the "lookup key" for which rule is being processed and any associated information from the scanner and, in some cases, a source file. The abstract updater do handle rule handler may be used for updating the state of the handler and target (with the source code). The abstract updater do handle rule handler may return nothing as the update handler and target may have been applied with applicable updates. The abstract updater is done handling handler may be set by the handler implementation when update processing has finished. By default, the abstract updater is done handling handler may return true but can be overridden by implementing handlers when needed for special cases. The abstract updater is done handling handler may return a Boolean, for example, if this handler has finished processing a rule or if additional processing is needed (or was handled by another processor). An abstract updater is skipped handler may be set by the handler implementation if the abstract updater is skipped handler had to skip any code that the handler was defined as being invocable on. This may be possible when a variable needs to be used for an update but cannot be located in the supplied source file. The abstract updater is skipped handler may return a boolean if this handler had to skip handling the triggered rule in the given source file.

The search string (string) parameter may include a stylized search string to build a pattern object (e.g., a regex pattern object, a JAVA™ regex pattern object) used for searching source files. The code type only (boolean) parameter may include an indication of whether or not only characters valid in the code type (e.g., JAVA™ identifiers) are allowed. The code type only parameter may be used when searching for identifiers such as variable names or class names. The abstract updater build search pattern may return a code type only pattern object (e.g., a JAVA™ pattern object) for scanning and selecting source code from a source file.

The update handler may be implementations of an update handler interface and may extend from and share functionality with an abstract updater handler. The update handlers may be invoked by the rules engine 502 to handle the action of the rule. For example, the update handler may receive billing information, customer details, and/or run mode (e.g., scope/quote vs update) from an external database (e.g., a repository). As another example, the update handler may receive from a rules engine 502 information about the rule being invoked, a customer being processed, and/or an object containing source code to be updated. As yet another example, the update handler may send to a rules engine 502 updated code, a count of a number of updates applied, a rate per update, and/or a sample of the invocation.

In some aspects, handlers may be grouped by levels. For example, a level one handler such as a simple updater handler may be an updater handler that performs a simple search and replace that preserves the contents of one or more variables. The simple updater handler may be used when a simple search and replace of the code is adequate. FIG. 9A illustrates a conceptual example of a simple updater handler 900 according to some aspects. The simple updater handler 900 may include a rule name 902 (e.g, "java/lang/Integer::<init>(I)V"), a search expression 904 (e.g., "new\\s+(?:java\\.lang\\.)?Integer\\(%VAR%\\)") such as a stylized search expression, and a replacement expression 906 (e.g., "Integer.valueOf\\(%VAR%\\)") such as a stylized replacement string. FIG. 9B illustrates a conceptual example of an input code 930 to be updated by the simple updater handler 900 according to some aspects. As shown in FIG. 9B, the input code 930 includes a first instance of a searched code string 932, a second instance of a searched code string 934, a third instance of a searched code string 936, and a fourth instance of a searched code string 938. FIG. 9C illustrates a conceptual example of an output code 950 previously updated by the simple updater handler 900 according to some aspects. As shown in FIG. 9C, the output code 950 includes a first instance of a replacement expression 952, a second instance of a replacement expression 954, a third instance of a replacement expression 956, and a fourth instance of a replacement expression 958. The simple update handler 900 may receive the input 930 and update the input code 930 to produce the output code 950. For example, the simple update handler 900 may update the first instance of a search expression 932 to the first instance of a replacement expression 952, the second instance of a search expression 934 to the second instance of a replacement expression 954, the third instance of a search expression 936 to the third instance of a replacement expression 956, and a fourth instance of a search expression 938 to the fourth instance of a replacement expression 958.

In some aspects, the simple updater handler 900 may conduct a smart search for the string pattern in the source code file that matches the defined search expression 904. The search expression 904 may be defined in the rule being invoked and may be passed to the one or more handlers 508. When a section of code has been found that matches the search expression, one or more variables (e.g., if any are defined in the search expression 904) may be identified and selected. The matching source code (e.g., a string of code) is then selected for replacement. A string of code to replace the matched string of code (e.g., a segment of code) is then built, with any identified variables being inserted into the replacement code segment as needed. The original code segment is then replaced with the generated code segment 906. In some aspect, when the original code segment is replaced with the generate code segment 906, a replacement count may be incremented.

In some aspects, the aforementioned process may be repeated, for example, until no more matches are found. Once the replacements are complete, the updated code may be stored in the previously passed object holding the source code. This object may also be updated with the count as well as any other information for later processing and display.

As another example, a level two handler such as a simple API updater handler may, similar to the simple updater handler may implement a search and replace, but may also execute a basic check on the object type of the targeted object in the selected source code. In some aspects, the simple API updater handler may search for usage of the targeted API, but may also check that the invocation is attached to an object of the appropriate type before modifying the source code. FIG. 10A illustrates a conceptual example of a level two API updater handler 1000 according to some aspects. In some aspects, the simple API updater handler 1000 may be level 2 handler. The simple API updater handler 1000 may include a rule name 1002 (e.g, "java/io/File::toURL( )java/net/URL"), a search expression 1004 (e.g., "%VAR%\\.toURL\\(\\)") such as a stylized search expression, a replacement expression 1006 (e.g., "%VAR%.toURI( ).toURL( ))") such as a stylized replacement string, and an object type 1008 (e.g., "File"). FIG. 10B illustrates a conceptual example of an input code 1030 to be updated by the simple API updater handler 1000 according to some aspects. As shown in FIG. 10B, the input code 1030 includes a first instance of a search expression 1032, a second instance of a search expression 1034, and an object type 1036. FIG. 10C illustrates a conceptual example of an output code 1050 previously updated by the simple API updater handler 1000 according to some aspects. As shown in FIG. 10C, the output code 1050 includes an instance of a search expression 1052, an object type 1054, and an instance of a replacement expression 1056. The simple API update handler 1000 may receive the input 1030 and update the input code 1030 to produce the output code 1050. For example, the simple API update handler 1000 may update the instance of a search expression 1032 to the instance of a replacement expression 1055.

In some aspects, the simple updater handler 1000 may conduct a smart search for the usage of the API via the defined search expression 1004. When a section of code has been found that matches the search expression 1004, one or more variables (if any are defined in the search expression 1004) may be identified and selected. The one or more variables that the API is being invoked on may be identified, and a smart search may be executed to determine an object type 1008. The search may include checking for the definition in the source code of the file. If the object type 1008 cannot be determined, or cannot be determined to be a matching type, then the update may be skipped and the next usage may be searched for. If the object type 1008 invoking the API matches the desired object type 1008, then the code with the API invocation may be selected for replacement. A string of code to replace the matched code segment may then be built, with any identified one or more variables being inserted into the replacement code segment as needed. The original code segment may then be replaced with the generated code segment, and the replacement count may be incremented.

In some aspects, the aforementioned process may be repeated, for example, until no more matches are found. Once the replacements are complete, the updated code may be stored in the previously passed object holding the source code. This object may also be updated with the count as well as any other information for later processing and display.

As another example, for a level three handler such as a big decimal handler (e.g., java.math.BigDecimalHandler), several APIs may have been deprecated, but may not have been marked for deletion. New APIs may utilize usage of an object (e.g., a JAVA™ Object) that is only recently defined in the language, java.math.RoundingMode. As a result, the targeted source file may need imports updated, and a modification that is more significant than a simple search a replace may be needed.

For a level three handler, the API being replaced may have one or more parameters, one or more of which may be replaced with a different value or object using, for example, an original parameter value to lookup or to otherwise compute. The handler may determine which parameter is to be replaced, and subsequently compute that new parameter. FIG. 11A illustrates a conceptual example of an input code 1100 for updating using a level three handler according to some aspects. As shown in FIG. 11A, the input code 1100 may include an object type 1102 (e.g., "BigDecimal") and a search expression 1104 (e.g., "bd.setScale(5, BigDecimal.ROUND_HALF_UP)") such as a stylized search expression. FIG. 11B illustrates a conceptual example of an output code 1150 after the input code 1100 is updated using the level three handler according to some aspects. As shown in FIG. 11B, the output code 1150 may include an object type 1152 (e.g., "BigDecimal") and a replacement expression 1154 (e.g., "RoundingMode.HALF_UP") such as a stylized replacement expression. FIG. 12A illustrates a conceptual example of an input code 1200 for updating using a level three handler according to some aspects. As shown in FIG. 12A, the input code 1200 may include an object type 1202 (e.g., "BigDecimal") and a search expression 1204 (e.g., "bd.setScale(5, 3);") such as a stylized search expression. FIG. 12B illustrates a conceptual example of an output code 1250 after the input code 1200 is updated using the level three handler according to some aspects. As shown in FIG. 12B, the output code 1250 may include an object type 1252 (e.g., "BigDecimal") and a replacement expression 1254 (e.g., "RoundingMode.valueOf(3))") such as a stylized replacement expression. FIG. 13A illustrates a conceptual example of an input code 1300 for updating using a level three handler according to some aspects. As shown in FIG. 13A, the input code 1300 may include an object type 1302 (e.g., "BigDecimal") and a search expression 1304 (e.g., "bd.setScale(5, getRoundingMode( ))") such as a stylized search expression. FIG. 13B illustrates a conceptual example of an output code 1350 after the input code 1300 is updated using the level three handler according to some aspects. As shown in FIG. 13B, the output code 1350 may include an object type 1352 (e.g., "BigDecimal") and a replacement expression 1354 (e.g., "RoundingMode.valueOf(getRoundingMode( ))") such as a stylized replacement expression.

In some aspects, the level three handler may perform a smart search for the usage of the API via a generated search expression. When a section of code has been found that matches the search expression, the one or more variables (if any are present) may be identified and selected. The variable that the API is being invoked on may be identified, and a smart search may be executed to determine the type is, for example, "BigDecimal." The search may include checking for the definition in the source code of the file. If the object type cannot be determined, or cannot be determined to be a matching type, then the update is skipped and the next usage is searched for. If the object type invoking the API matches, in this case, "BigDecimal, then the code with the API invocation may be selected for replacement. A string to replace the matched code segment may then be built, with any identified variables being inserted into the replacement code segment as needed. As part of the replacement, the invocation of the "RoundingMode" that is needed may be determined. In some aspects, an original code segment may then be replaced with the generated code segment, and the replacement count may be incremented.

In some aspects, the aforementioned process may be repeated, for example, until no more matches are found.

Once the replacements are complete, the updated code may be stored in the previously passed object holding the source code. This object may also be updated with the count as well as any other information for later processing and display.

For a level four handler (e.g., AccessibleObjectIsAccessibleHandler), for example, in JAVA™ version 9, the API "java/lang/reflect/AccessibleObject:isAccessible( )Z" may have been deprecated, and replaced with "java/lang/reflect/AccessibleObject::canAccess(object)Z." An old API may not have taken a parameter and may not have been invoked on an object that could be passed to the API. The level four handler may need to determine what object in the source code should be passed to the new API, and if so, may generate the new code using the determined source object. FIG. 14A illustrates a conceptual example of an input code 1400 for updating using a level four handler according to some aspects. As shown in FIG. 14A, the input code 1400 may include a search expression 1402 (e.g., "field.isAccessible( )") such as a stylized search expression. FIG. 14B illustrates a conceptual example of an output code 1450 after the input code 1400 is updated using the level four handler according to some aspects. As shown in FIG. 14B, the output code 1450 may include a search expression 1452 (e.g., "source") such as a stylized search expression, and a replacement expression 1454 (e.g., "canAccess(source))") such as a stylized replacement expression. In some aspects, a call to the deprecated API may be identified. A name of a variable for the invoking object may be identified, and subsequently the declaration of the variable may be identified. From this variable declaration, the reference to the source object for the call may be determined. The reference may then be passed as a parameter to the new API in the replacement code. It should be noted that in some cases the source object may (e.g., should) not be passed. The level four handler may identify those conditions and pass a "null" value instead.

For a level five handler (e.g., SQLSlammerHandler), for example in JAVA™. SQL statements may be inappropriately used. SQL "PreparedStatements" may be used in at least some cases where SQL statements are used by coders. It should be noted that such an issue may not be a deprecation issue, but may be instead a security, performance, and "codesmell" issue that may be detected by static code analyzers, including SONARQUBE™. A scanner, such a SONARQUBE™ scanner, may include one or more line numbers and one or more character offsets in results and reports. FIG. 15A illustrates a conceptual example of an input code 1500 for updating using a level five handler according to some aspects. As shown in FIG. 15A, the input code 1500 may include a search expression 1502 (e.g., "Statement s=connection.createStatement( )") such as a stylized search expression, a first object type 1504 (e.g., "newUserName"), and a second object type 1506 (e.g., "+userId"). In some aspects, the first object type 1504 may be a first variable name and the second object type may be a second variable name. FIG. 15B illustrates a conceptual example of an output code 1550 after the input code 1500 is updated using the level four handler according to some aspects. As shown in FIG. 15B, the output code 1550 may include, a different SQL object, java.sql.PreparedStatement, a new SQL command string, the first object type 1504 (e.g., "newUserName"), and the second object type 1506 (e.g., "userId"). In some aspects, a location of statement creation may be identified. SQL Query may be identified, with one or more variables identified and selected. An SQL Query for a prepared statements may then be generated, with a '?' inserted at appropriate locations for the one or more variables. Then code invoking appropriate set calls may be generated. Once the replacement code has been generated, the replacement code may be inserted into the source code file in the place of the problematic code. In some aspects, the output code 1550 may include a change to a statement type as shown in a first updated string of code 1552 (e.g., "ps=connection.prepareStatement ("Update name=? where id=?")). For example, the input code 1500 of FIG. 15A included the statement type "statement s". After updating the input code 1500 to produce the output code 1550, as shown in FIG. 15B, the statement type is changed to "final PreparedStatement ps". In some aspects, the first updated string of code 1552 may include an input string (e.g., "("Update name=? where id=?")"). Additionally, or alternatively, the output code 1550 may include a change of the input string from multiple string fragments to one string as shown in a second updated string of code 1554. In some aspects, one or more variables names may be changed from the input code 1500 to the output code 1550. For example, as shown in FIG. 15A, the first object type 1504 may have included the first variable name (e.g., "newUserName") and second object type 1506 may have included the second variable name (e.g., "userId"). After updating one or more strings of code, the first variable name and/or the second variable name of the updated code 1550 may have been updated to a "?" as shown in FIG. 15B.

In some aspects, a report may be provided. The reporter may gather data sent to the updater agent 510 by the rules engine 502 and may format the sent data (e.g., in a PDF) for general viewing either on a computer screen or via printout. By default, the sent data may be saved to a local hard disk for display and retrieval. Generally, the input for the reporter may be the output from the rules engine 502 for the updater agent 510 and the output may be one or more of a UpdateReport, a ScopeReviewReport, a OpenSourceReport, or a ExecutionReport. In some aspects, one or more of the "UpdateReport", the ScopeReviewReport, the OpenSourceReport, and/or the ExecutionReport may illustrate one or more changes, modifications, and/or update to one or more strings of code of a project file from an initial version of the code to a final or updated version of the code.

In some aspects, after the one or more handlers 508 update the at least one non-updated string of code identified by at least one handler of the one or more handlers, the rules engine 502 may receive from the one or more handlers 508 an indication that the at least one non-updated string of code uniquely associated with the at least one handler is an updated string of code. In some aspects, the one or more handlers 508 may provide the updated string of code to the rules engine 502 using the indication. For example, once every selected handler has finished processing, the rules engine 502 may receive the updated source files from the one or more handlers and send the updated source files back to the updater agent 510 for the updater agent 510 to write the project file back to the project source (e.g., the repository 222 of FIG. 2, the first repository 114a of FIG. 1, the second repository 114b of FIG. 1). These files can then be reviewed and/or recompiled to produce an updated version of the project file. In some aspects, the rules engine 502 may generate for display on a display screen the updated version of the project file. Subsequently, the updated version of the project file may be displayed on a display screen for viewing. For example, the rules engine 502 may send processing and accounting data to the updater agent 510 including the project file with the updated source code for reporting purposes. Additionally, or alternatively, the rules engine 502 may send billing and processing data to ERP system for tracking and logging purposes. Depending on the configuration, the rules engine 502 may access the ERP system to determine if updates should actually be applied, or if the approximate level of effort should be estimated for an approximate quote.

FIG. 8 illustrates a conceptual example of an updated project file 800 according to some aspects. The updated project file may be sent from the rules engine 502 to the updater agent 510 via the updater system communication channel 512 and the firewall 514. As shown in FIG. 8, the updated project file 800 includes one or more updates 802 include a first update 804, a second update 806, and a third update 808. In some aspects, each of the one or more updates 802 may be a same update such as "Integer, valueOf". Alternatively, at least one update of the one or more updates 802 may be a unique or different update from a remaining one or more updates.

In some aspects, the set of one or more rules may associate each of the one or more handlers with updating at least one unique non-updated string of code. For example, each of the plurality of handler 508 may be created on a per-rule basis. Rules may be triggered by the contents of the results, with zero or more rules being triggered per result. In some aspects, not all results may have rules and/or handlers configured for them. Results with no rules or handlers may be known as "skipped" results. When a handler 508 is available, a results entry and associated in question may be put in an "in-progress" list until processing is completed.

Figure 16:
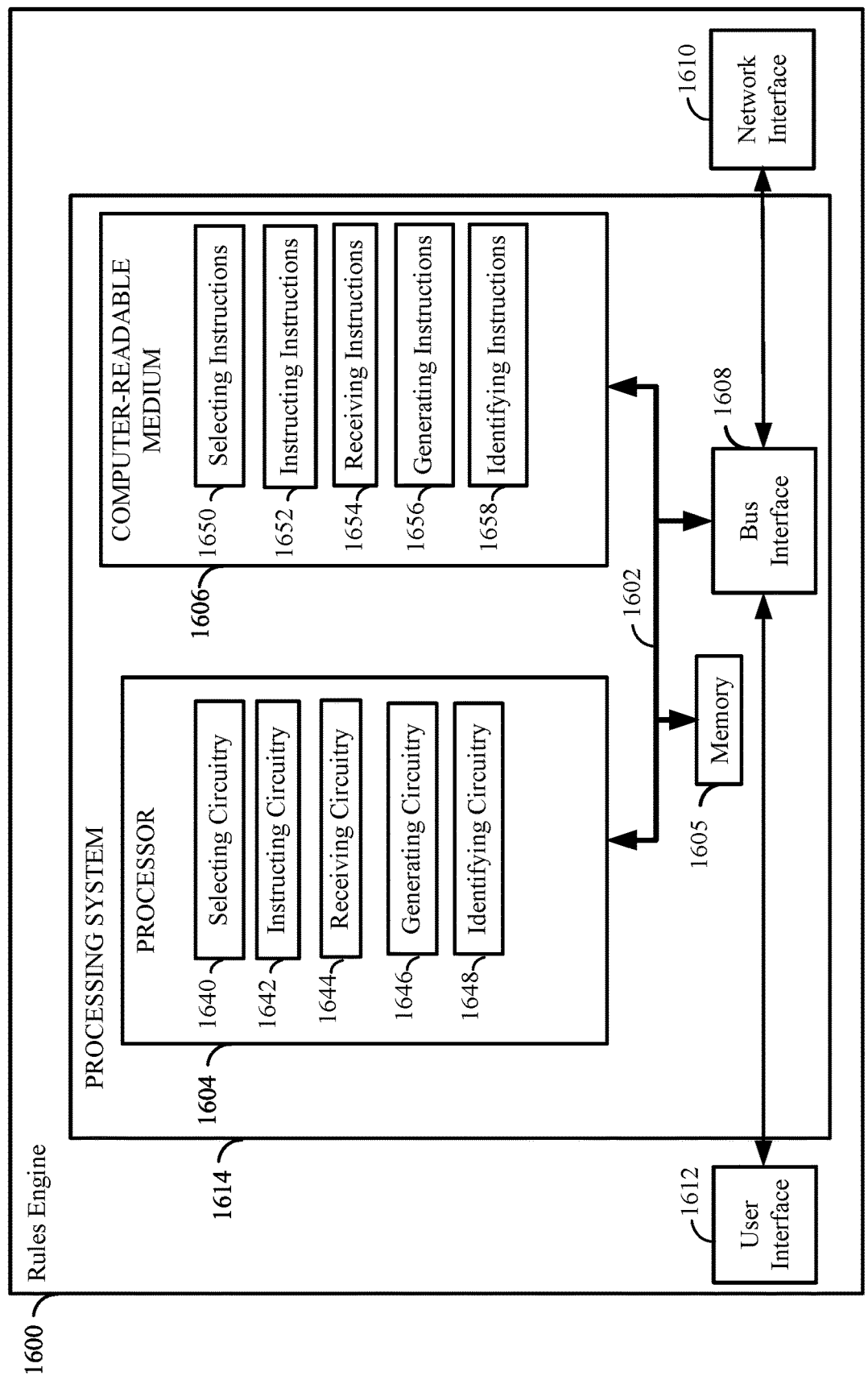
FIG. 16 is a block diagram illustrating an example of a hardware implementation for a rules engine employing a processing system according to some aspects.

FIG. 16 is a block diagram illustrating an example of a hardware implementation for a rules engine 1600 employing a processing system 1614 according to some aspects. For example, the rules engine 1600 may correspond to any of the entities shown and described herein in any one or more of FIGS. 1, 2, and 5.

The rules engine 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the rules engine 1600 may be configured to perform any one or more of the functions described herein. That is, the processor 1604, as utilized in a rules engine 1600, may be used to implement any one or more of the processes described herein. The processor 1604 may in some instances be implemented via a baseband or modem chip and in other implementations, the processor 1604 may itself comprise a number of devices distinct and different from a baseband or modem chip (e.g., in such scenarios it may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), and computer-readable media (represented generally by the computer-readable storage medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610. The network interface 1610 provides a means for communicating with various other apparatus over a transmission medium (e.g., data interface). In some aspects, the network interface 1610 may be used to receive a data file containing one or more non-updated strings of code. In some aspects, the network interface 1610 may be used to transmit a data file containing one or more updated strings of code. A user interface 1612 (e.g., keypad, display, speaker, microphone, joystick) may also be provided. In some aspects, the user interface 1612 may be used to display code of a data file containing one or more non-updated strings of code. In some aspects, the user interface 1612 may be used to display code of a data file containing one or more updated strings of code.

The processor 1604 is responsible for managing the bus 1602 and general processing, including the execution of software stored on the computer-readable storage medium 1606. The software, when executed by the processor 1604, causes the processing system 1614 to perform the various functions described herein for any particular apparatus. The computer-readable storage medium 1606 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1606.

The computer-readable storage medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1606 may reside in the processing system 1614, external to the processing system 1614, or distributed across multiple entities including the processing system 1614. The computer-readable storage medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1604 may include selecting circuitry configured for various functions. For example, the processor 1604 may include selecting circuitry 1640 configured to select one or more handlers for updating one or more non-updated strings of code of a plurality of strings of code associated with a file and according to a set of one or more rules. The set of one or more rules may associate each of the one or more handlers with updating at least one unique non-updated string of code. The selecting circuitry 1640 may be configured to execute selecting instructions 1650 stored in the computer-readable storage medium 1606 to implement any of the one or more of the functions described herein.

The processor 1604 may also include instructing circuitry 1642 configured to instruct at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler. The instructing circuitry 1642 may be configured to execute instructing instructions 1652 stored in the computer-readable storage medium 1606 to implement any of the one or more of the functions described herein.

The processor 1604 may further include receiving circuitry 1644 configured to receive, from the at least one handler, an indication that the at least one non-updated string of code uniquely associated with the at least one handler is an updated string of code. The receiving circuitry 1644 may also be configured to receive, from a scanner, the plurality of strings of code associated with the file. Each of the plurality of strings of code may include scanned strings of code. The receiving circuitry 1644 may be configured to execute receiving instructions 1654 stored in the computer-readable storage medium 1606 to implement any of the one or more of the functions described herein.

The processor 1604 may further include generating circuitry 1646 configured to generate for display on a display screen at least the updated string of code. The generating circuitry 1646 may be configured to execute generating instructions 1656 stored in the computer-readable storage medium 1606 to implement any of the one or more of the functions described herein.

The processor 1604 may further include identifying circuitry 1648 configured to identify the one or more non-updated strings of code of the plurality of strings of code. The identifying circuitry 1648 may be configured to execute identifying instructions 1658 stored in the computer-readable storage medium 1606 to implement any of the one or more of the functions described herein.

Figure 17:
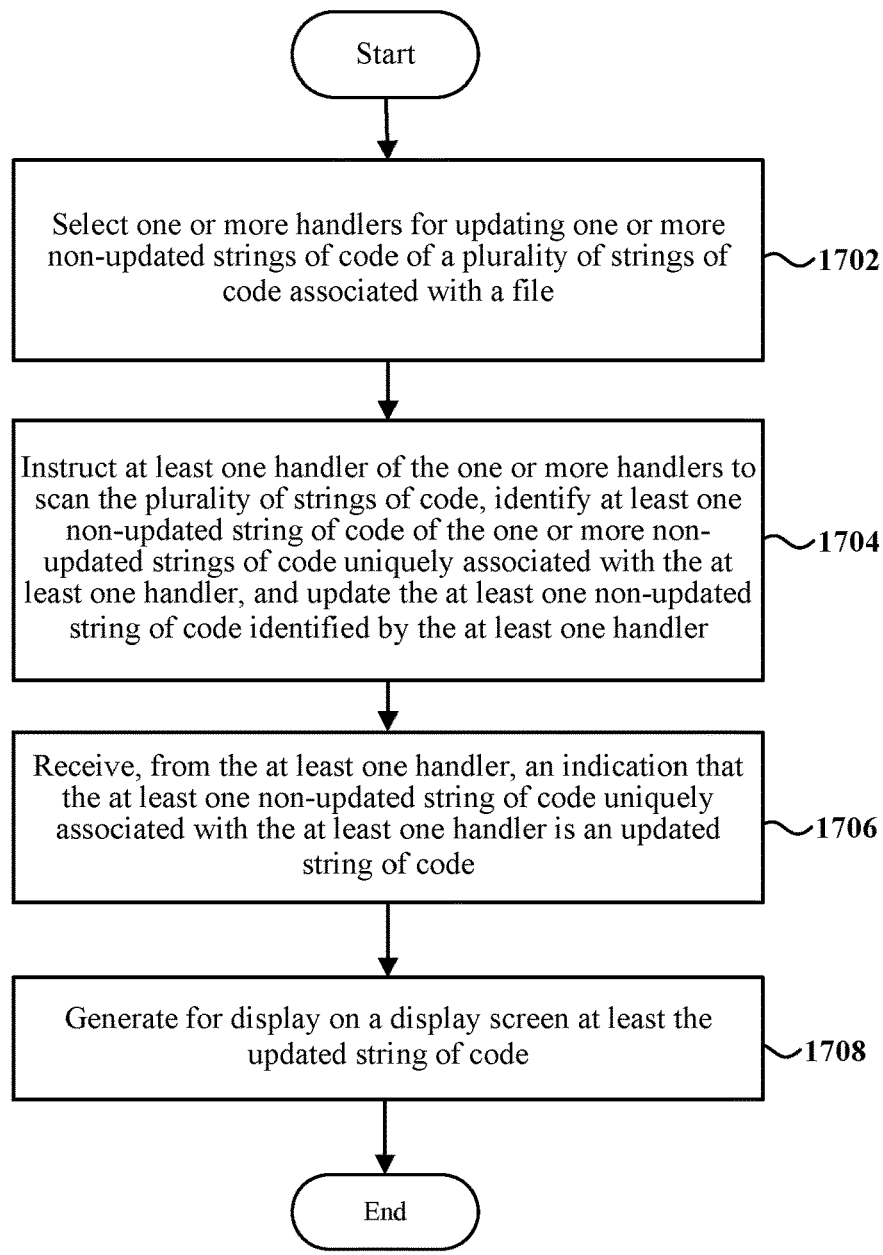
FIG. 17 is a flow chart of a method implemented by a rules engine for updating one or more strings of code according to some aspects.

FIG. 17 is a flow chart 1700 of a method implemented by a rules engine for updating one or more strings of code according to some aspects. As described below, some or all illustrated features may be omitted in a particular implementation within the scope of the present disclosure, and some illustrated features may not be required for implementation of all aspects. In some examples, the method may be performed by the rules engine 1600, as described herein, and illustrated in FIG. 16, by a processor or processing system, or by any suitable means for carrying out the described functions.

At block 1702, the rules engine 1600 may select one or more handlers for updating one or more non-updated strings of code of a plurality of strings of code associated with a file and according to a set of one or more rules. In some aspects, the set of one or more rules associates each of the one or more handlers with updating at least one unique non-updated string of code. At block 1704, the rules engine 1600 may instruct at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler.

In some aspects, instructing the at least one handler of the one or more handlers to update the at least one non-updated string of code may include instructing the at least one handler to update at least one of a syntax of the non-updated string of code, a variable of the non-updated string of code, or an object of the non-updated string of code. In some aspects, the rules engine 1600 instructing the at least one handler of the one or more handlers to update the at least one non-updated string of code may instruct the at least one handler of the one or more handlers to update the at least one non-updated string of code from an initial version of the code to an updated version of the code. For example, At block 1706, the rules engine 1600 may receive, from the at least one handler, an indication that the at least one non-updated string of code uniquely associated with the at least one handler is an updated string of code. For example, In some aspects, the rules engine 1600 receiving, from the scanner, the plurality of strings of code associated with the file may include receiving, from the scanner, an indication of the one or more non-updated strings of code of the plurality of strings of code. In some aspects, the updated version may include a version of the code immediately preceding the initial version of the code. In some aspects, the updated version may include a most recent version of the code.

At block 1708, the rules engine 1600 may generate for display on a display screen at least the updated string of code. In some examples, before selecting the one or more handlers, the rules engine 1600 may receive, from a scanner, the plurality of strings of code associated with the file, wherein each of the plurality of strings of code comprise scanned strings of code. In some aspects, the rules engine 1600 receiving, from the scanner, the plurality of strings of code associated with the file may include receiving, from the scanner, an indication of the one or more non-updated strings of code of the plurality of strings of code. In some aspects, before selecting the one or more handlers, the rules engine may further identify the one or more non-updated strings of code of the plurality of strings of code. In some aspects, the rules engine 1600 identifying the one or more non-updated strings of code of the plurality of strings of code may be based on the indication.

In one configuration, the first UE 1600 includes means for performing the various functions and processes described in relation to FIG. 17. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, and 5, and utilizing, for example, the processes and/or algorithms described herein in relation to FIG. 17.

Figure 18:
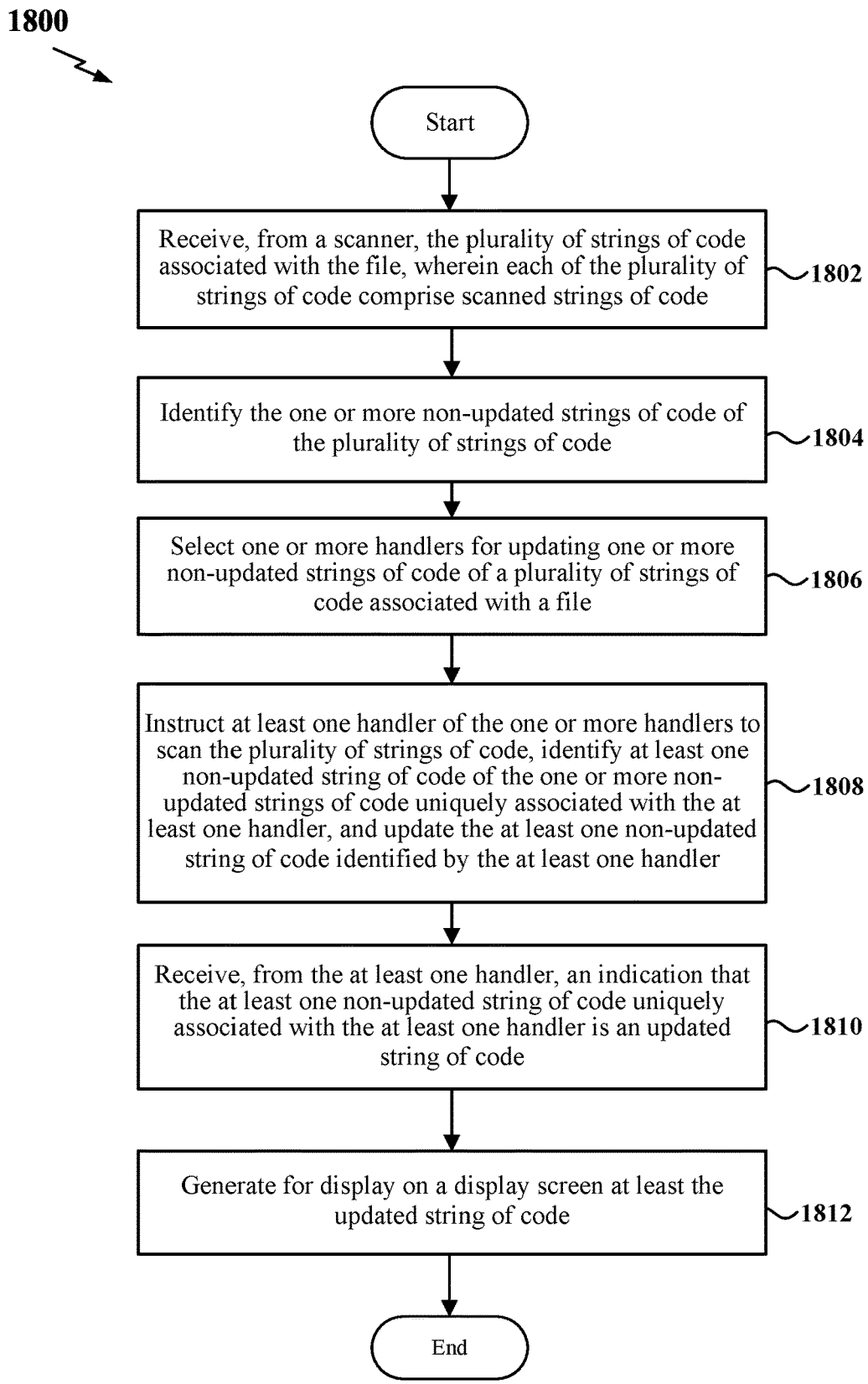
FIG. 18 is a flow chart of a method implemented by a rules engine for updating one or more strings of code according to some aspects.

FIG. 18 is a flow chart 1800 of a method implemented by a rules engine for updating one or more strings of code according to some aspects. As described below, some or all illustrated features may be omitted in a particular implementation within the scope of the present disclosure, and some illustrated features may not be required for implementation of all aspects. In some examples, the method may be performed by the rules engine 1600, as described herein, and illustrated in FIG. 16, by a processor or processing system, or by any suitable means for carrying out the described functions.

At block 1802, the rules engine 1600 may receive, from a scanner, a plurality of strings of code associated with the file. Each of the plurality of strings of code may include scanned strings of code. In some aspects, the rules engine 1600 may receive, from the scanner, the plurality of strings of code associated with the file before the rules engine 1600 selects one or more handlers. In some aspects, the rules engine 1600 receiving, from the scanner, the plurality of strings of code associated with the file may include receiving, from the scanner, an indication of the one or more non-updated strings of code of the plurality of strings of code.

At block 1804, the rules engine 1600 may identify one or more non-updated strings of code of the plurality of strings of code. In some aspects, the rules engine 1600 may identify one or more non-updated strings of code of the plurality of strings of code before selecting one or more handlers. At block 1806, the rules engine 1600 may select one or more handlers for updating one or more non-updated strings of code of a plurality of strings of code associated with a file and according to a set of one or more rules. In some aspects, the set of one or more rules associates each of the one or more handlers with updating at least one unique non-updated string of code. At block 1808, the rules engine 1600 may instruct at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler.

In some aspects, instructing the at least one handler of the one or more handlers to update the at least one non-updated string of code may include instructing the at least one handler to update at least one of a syntax of the non-updated string of code, a variable of the non-updated string of code, or an object of the non-updated string of code. In some aspects, the rules engine 1600 instructing the at least one handler of the one or more handlers to update the at least one non-updated string of code may instruct the at least one handler of the one or more handlers to update the at least one non-updated string of code from an initial version of the code to an updated version of the code.

At block 1810, the rules engine 1600 may receive, from the at least one handler, an indication that the at least one non-updated string of code uniquely associated with the at least one handler is an updated string of code. In some aspects, the rules engine 1600 receiving, from the scanner, the plurality of strings of code associated with the file may include receiving, from the scanner, an indication of the one or more non-updated strings of code of the plurality of strings of code. In some aspects, the updated version may include a version of the code immediately preceding the initial version of the code. In some aspects, the updated version may include a most recent version of the code. In some aspects, the rules engine 1600 identifying the one or more non-updated strings of code of the plurality of strings of code may be based on the indication. At block 1812, the rules engine 1600 may generate for display on a display screen at least the updated string of code.

In one configuration, the first UE 1600 includes means for performing the various functions and processes described in relation to FIG. 17. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, and 5, and utilizing, for example, the processes and/or algorithms described herein in relation to FIG. 16.

Figure 19:
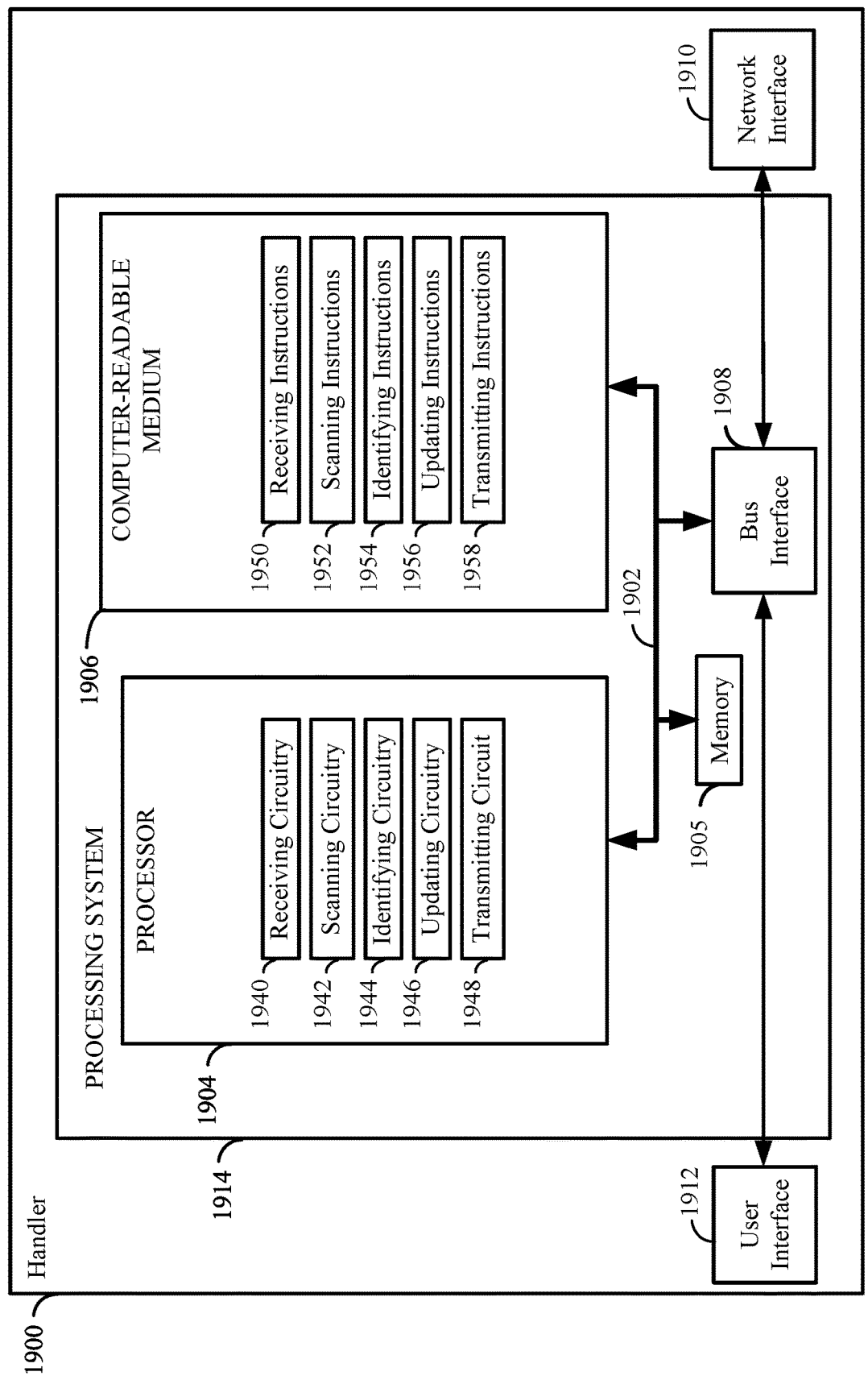
FIG. 19 is a block diagram illustrating an example of a hardware implementation for a handler employing a processing system according to some aspects.

FIG. 19 is a block diagram illustrating an example of a hardware implementation for a handler 1900 employing a processing system 1914 according to some aspects. For example, the handler 1900 may be any of the devices illustrated in any one or more of FIGS. 1, 2, and 5. In some examples, the handler 1900 may be any one or more of the first handler 508a, the second handler 508b, the third handler 508c, or the fourth handler 508d.

In accordance with various aspects of the disclosure, an element, or any portion of an element, or any combination of elements may be implemented with a processing system 1914 that includes one or more processors 1904. The processing system 1914 may be substantially the same as the processing system 1614 illustrated in FIG. 16, including a bus interface 1908, a bus 1902, a processor 1904, and a computer-readable storage medium 1906. Furthermore, the handler 1900 may include a user interface 1912 and a network interface 1910 substantially similar to those described herein in FIG. 16. That is, the processor 1904, as utilized in the handler 1900, may be used to implement any one or more of the processes described herein.

In some aspects of the disclosure, the processor 1904 may include circuitry configured for various functions. For example, the processor 1904 may include receiving circuitry 1940 configured to receive, from a rules engine, access to a plurality of strings of code associated with a file. The plurality of strings of code may include one or more non-updated strings of code. The receiving circuitry 1940 may also be configured to receive, from the rules engine, an indication (e.g., a second indication) that the handler is of a set of at least one handlers selected for updating the at least one non-updated string of code of the one or more non-updated strings of code based on a set of one or more rules that associate each of the set of at least one handler with updating at least one unique non-updated string of code. The receiving circuitry 1940 may be configured to execute receiving instructions 1950 stored in the computer-readable storage medium 1906 to implement any of the one or more of the functions described herein.

The processor 1904 may also include scanning circuitry 1942 configured to scan a plurality of strings of code. The scanning circuitry 1942 may be configured to execute scanning instructions 1952 stored in the computer-readable storage medium 1906 to implement any of the one or more of the functions described herein.

The processor 1904 may further include identifying circuitry 1944 configured to identify, for example, based on scanning a plurality of strings of code, at least one non-updated string of code of the one or more non-updated strings of code uniquely associated with the handler. The identifying circuitry 1944 may also be configured to execute identifying instructions 1954 stored in the computer-readable storage medium 1906 to implement any of the one or more of the functions described herein.

In addition, the processor 1904 may include updating circuitry 1946 configured to update the at least one non-updated string of code identified by the handler for display on a display screen. The updating circuitry 1946 may be configured to execute updating instructions 1956 stored in the computer-readable storage medium 1906 to implement any of the one or more of the functions described herein.

The processor 1904 may also include transmitting circuitry 1948 configured to transmit, to the rules engine, an indication (e.g., a first indication) that the at least one non-updated string of code of the one or more non-updated strings of code uniquely associated with the handler is an updated string of code for display on the display screen. The transmitting circuitry 1948 may be configured to execute transmitting instructions 1958 stored in the computer-readable storage medium 1906 to implement any of the one or more of the functions described herein.

Figure 20:
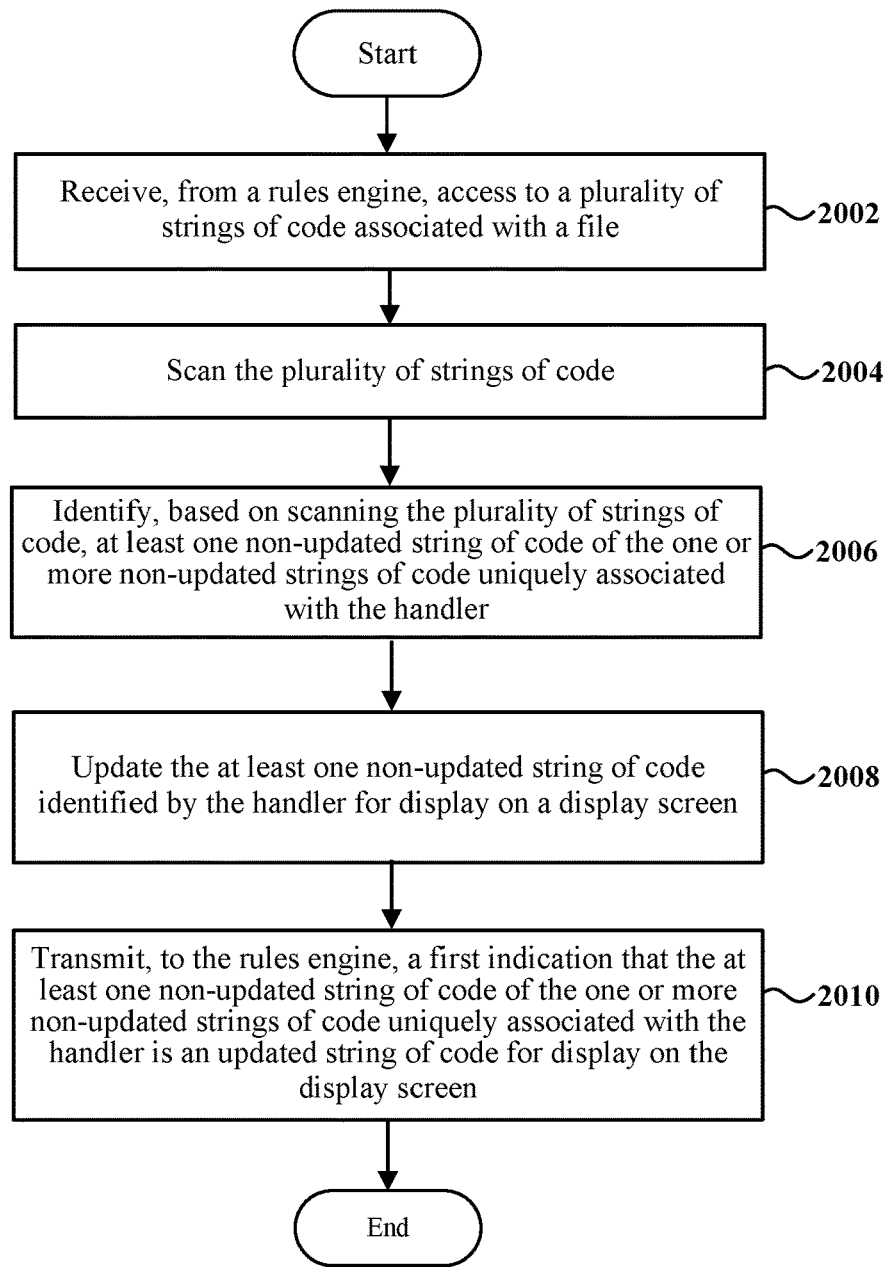
FIG. 20 is a flow chart of a method implemented by a handler for updating one or more strings of code according to some aspects.

FIG. 20 is a flow chart 1200 of a method implemented by a handler 1900 for updating one or more strings of code according to some aspects. As described below, some or all illustrated features may be omitted in a particular implementation within the scope of the present disclosure, and some illustrated features may not be required for implementation of all aspects. In some examples, the method may be performed by the handler 1900, as described above, and illustrated in FIG. 19, by a processor or processing system, or by any suitable means for carrying out the described functions.

At block 2002, the handler 1900 may receive, from a rules engine, access to a plurality of strings of code associated with a file. The plurality of strings of code may include one or more non-updated strings of code. At block 2004, the handler 1900 may scan the plurality of strings of code. At block 2006, the handler 1900 may identify, based on scanning the plurality of strings of code, at least one non-updated string of code of the one or more non-updated strings of code uniquely associated with the handler. In some aspects, the handler 1900 may identify at least one non-updated string of code of the one or more non-updated strings of code uniquely associated with the handler based on scanning the plurality of strings of code. At block 2008, the handler 1900 may update the at least one non-updated string of code identified by the handler 1900 for display on a display screen. At block 2010, the handler 1900 may transmit, to the rules engine, a first indication that the at least one non-updated string of code of the one or more non-updated strings of code uniquely associated with the handler is an updated string of code for display on the display screen.

In one configuration, the handler 1900 includes means for performing the various functions and processes described in relation to FIG. 20. In one aspect, the aforementioned means may be the processor 1904 shown in FIG. 19 configured to perform the functions recited by the aforementioned means. In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable storage medium 1906, or any other suitable apparatus or means described in any one of the FIGS. 1, 2, and 5, and utilizing, for example, the processes and/or algorithms described herein in relation to FIG. 19.

Figure 21:
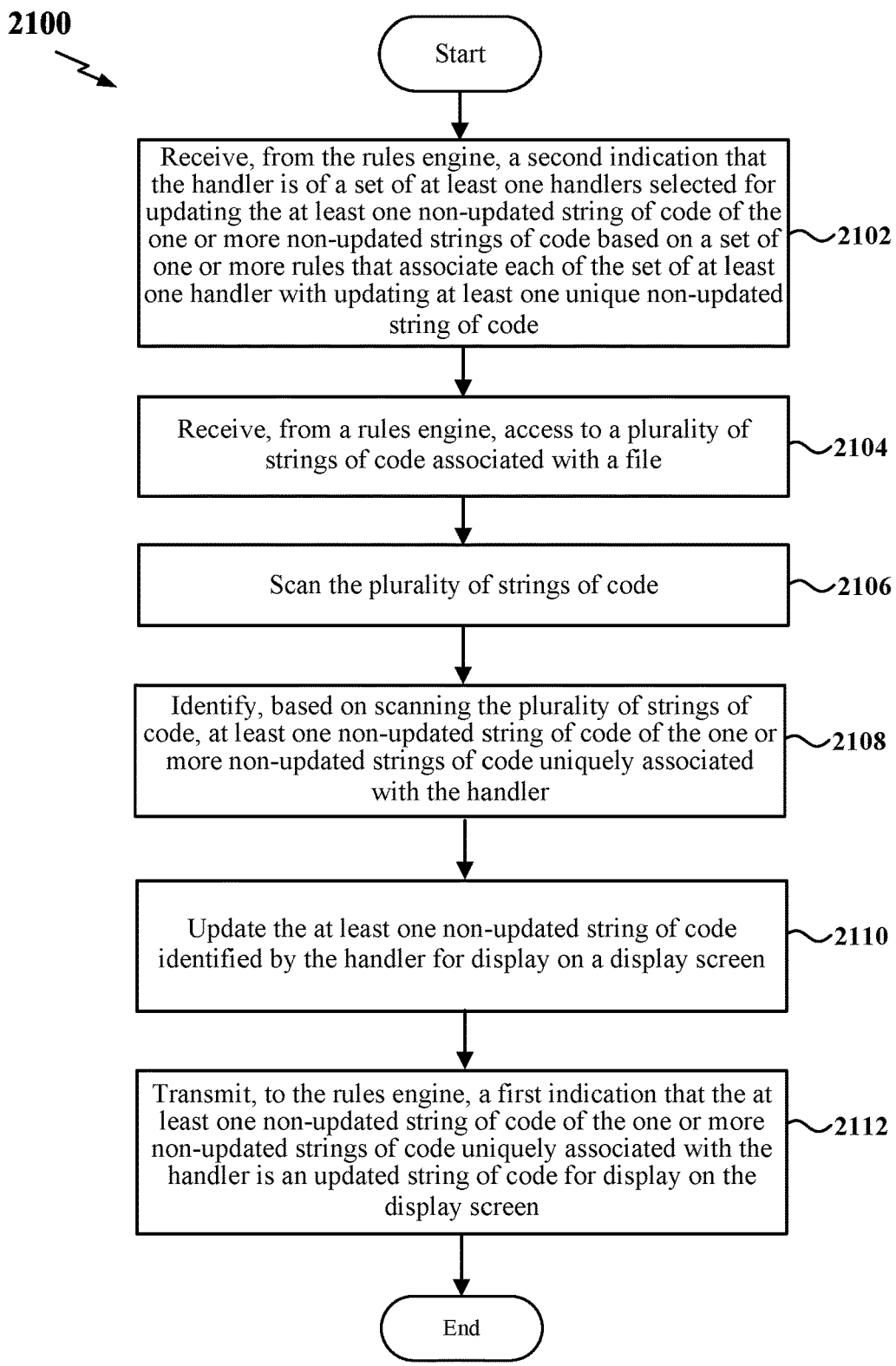
FIG. 21 is a flow chart of a method implemented by a handler for updating one or more strings of code according to some aspects.

FIG. 21 is a flow chart 2100 of a method implemented by a handler 1900 for updating one or more strings of code according to some aspects. As described below, some or all illustrated features may be omitted in a particular implementation within the scope of the present disclosure, and some illustrated features may not be required for implementation of all aspects. In some examples, the method may be performed by the handler 1900, as described above, and illustrated in FIG. 19, by a processor or processing system, or by any suitable means for carrying out the described functions.

At block 2102, the handler 1900 may receive, from a rules engine, access to a plurality of strings of code associated with a file. The plurality of strings of code may include one or more non-updated strings of code. At block 2104, the handler 1900 may receive, from a rules engine, a second indication that the handler 1900 is of a set of at least one handlers selected for updating the at least one non-updated string of code of the one or more non-updated strings of code based on a set of one or more rules that associate each of the set of at least one handler with updating at least one unique non-updated string of code. At block 2106, the handler 1900 may scan the plurality of strings of code. At block 2108, the handler 1900 may identify, based on scanning the plurality of strings of code, at least one non-updated string of code of the one or more non-updated strings of code uniquely associated with the handler. In some aspects, the handler 1900 may identify at least one non-updated string of code of the one or more non-updated strings of code uniquely associated with the handler based on scanning the plurality of strings of code.

At block 2110, the handler 1900 may update the at least one non-updated string of code identified by the handler 1900 for display on a display screen. At block 2112, the handler 1900 may transmit, to the rules engine, a first indication that the at least one non-updated string of code of the one or more non-updated strings of code uniquely associated with the handler is an updated string of code for display on the display screen.

In one configuration, the handler 1900 includes means for performing the various functions and processes described in relation to FIG. 21. In one aspect, the aforementioned means may be the processor 1904 shown in FIG. 19 configured to perform the functions recited by the aforementioned means. In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable storage medium 1906, or any other suitable apparatus or means described in any one of the FIGS. 1, 2, and 5, and utilizing, for example, the processes and/or algorithms described herein in relation to FIG. 21.

In a first aspect, a rules engine is provided. The rules engine includes a memory and one or more processors in electronic communication with the memory. The one or more processors are configured to select one or more handlers for updating one or more non-updated strings of code of a plurality of strings of code associated with a file and according to a set of one or more rules, wherein the set of one or more rules associates each of the one or more handlers with updating at least one unique non-updated string of code. The one or more processors are also configured to instruct at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler. The one or more processors are further configured to receive, from the at least one handler, an indication that the at least one non-updated string of code uniquely associated with the at least one handler is an updated string of code. In addition, the one or more processors are configured to generate for display on a display screen at least the updated string of code.

In a second aspect, alone or in combination with the first aspect, before selecting the one or more handlers, the one or more processors are further configured to receive, from a scanner, the plurality of strings of code associated with the file, wherein each of the plurality of strings of code comprise scanned strings of code, and identify the one or more non-updated strings of code of the plurality of strings of code.

In a third aspect, alone or in combination with one or more of the first and second aspects, receiving, from the scanner, the plurality of strings of code associated with the file comprises receiving, from the scanner, an indication of the one or more non-updated strings of code of the plurality of strings of code, and identifying the one or more non-updated strings of code of the plurality of strings of code is based on the indication.

In a fourth aspect, alone or in combination with one or more of the first through third aspects, instructing the at least one handler of the one or more handlers to update the at least one non-updated string of code comprises instructing the at least one handler to update at least one of a syntax of the non-updated string of code, a variable of the non-updated string of code, or an object of the non-updated string of code.

In a fifth aspect, alone or in combination with one or more of the first through fourth aspects, instructing the at least one handler of the one or more handlers to update the at least one non-updated string of code comprises instructing the at least one handler of the one or more handlers to update the at least one non-updated string of code from an initial version of the code to an updated version of the code.

In a sixth aspect, alone or in combination with one or more of the first through fifth aspects, the updated version comprises a version of the code immediately preceding the initial version of the code.

In a seventh aspect, alone or in combination with one or more of the first through sixth aspects, the updated version comprises a most recent version of the code.

In an eighth aspect, a handler is provided. The handler includes a memory and one or more processors in electronic communication with the memory. The one or more processors are configured to receive, from a rules engine, access to a plurality of strings of code associated with a file, wherein the plurality of strings of code comprise one or more non-updated strings of code. The one or more processors are also configured to scan the plurality of strings of code. The one or more processors are further configured to identify, based on scanning the plurality of strings of code, at least one non-updated string of code of the one or more non-updated strings of code uniquely associated with the handler. In addition, the one or more processors are configured to update the at least one non-updated string of code identified by the handler for display on a display screen. The one or more processors are also configured to transmit, to the rules engine, a first indication that the at least one non-updated string of code of the one or more non-updated strings of code uniquely associated with the handler is an updated string of code for display on the display screen.

In a ninth aspect, alone or in combination with the eighth aspect, the one or more processors are further configured to receive, from the rules engine, a second indication that the handler is of a set of at least one handlers selected for updating the at least one non-updated string of code of the one or more non-updated strings of code based on a set of one or more rules that associate each of the set of at least one handler with updating at least one unique non-updated string of code; and in response to receiving the second indication scan the plurality of strings of code, identify, based on scanning the plurality of strings of code, the at least one non-updated string of code of the one or more non-updated strings of code uniquely associated with the handler, and update the at least one non-updated string of code identified by the handler for display on a display screen.

In a tenth aspect, alone or in combination with the eighth and ninth aspects, updating the at least one non-updated string of code comprises updating at least one of a syntax of the at least one non-updated string of code, a variable of the at least one non-updated string of code, or an object of the at least one non-updated string of code.

In an eleventh aspect, alone or in combination with the eighth through tenth aspects, updating the at least one non-updated string of code comprises updating the at least one non-updated string of code from an initial version of the code to an updated version of the code.

In a twelfth aspect, alone or in combination with the eighth through eleventh aspects, the updated version comprises a version of the code immediately preceding the initial version of the code.

In a thirteenth aspect, alone or in combination with the eighth through twelfth aspects, the updated version comprises a version of the code immediately preceding the initial version of the code.

In a thirty-third aspect, alone or in combination with the twenty-seventh through thirty-second aspects, the updated version comprises a most recent version of the code.

In one configuration, a rules engine includes means for selecting one or more handlers for updating one or more non-updated strings of code of a plurality of strings of code associated with a file and according to a set of one or more rules, wherein the set of one or more rules associates each of the one or more handlers with updating at least one unique non-updated string of code, means for instructing at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler, means for receiving, from the at least one handler, an indication that the at least one non-updated string of code uniquely associated with the at least one handler is an updated string of code, and means for generating for display on a display screen at least the updated string of code.

In one aspect, the aforementioned means for selecting one or more handlers for updating one or more non-updated strings of code of a plurality of strings of code associated with a file and according to a set of one or more rules, wherein the set of one or more rules associates each of the one or more handlers with updating at least one unique non-updated string of code, means for instructing at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler, means for receiving, from the at least one handler, an indication that the at least one non-updated string of code uniquely associated with the at least one handler is an updated string of code, and means for generating for display on a display screen at least the updated string of code may be the processor(s) 1604 shown in FIG. 16 configured to perform the functions recited by the aforementioned means. For example, the aforementioned means for selecting one or more handlers for updating one or more non-updated strings of code of a plurality of strings of code associated with a file and according to a set of one or more rules, wherein the set of one or more rules associates each of the one or more handlers with updating at least one unique non-updated string of code may include the selecting circuitry 1640 in FIG. 16. As another example, the aforementioned means for instructing at least one handler of the one or more handlers to scan the plurality of strings of code, identify, based on scanning the plurality of strings of code, at least one non-updated string of code of the one or more non-updated strings of code uniquely associated with the at least one handler, and update the at least one non-updated string of code identified by the at least one handler may include the instructing circuitry 1642 shown in FIG. 16. As yet another example, the aforementioned means for receiving, from the at least one handler, an indication that the at least one non-updated string of code uniquely associated with the at least one handler is an updated string of code may include the receiving circuitry 1644 together with the network interface 1610 shown in FIG. 16. As yet another example, the aforementioned means for generating for display on a display screen at least the updated string of code may include the generating circuitry 1646 shown in FIG. 16. In another aspect, the aforementioned means may be a circuit or any apparatus configured to perform the functions recited by the aforementioned means.

In one configuration, a handler includes means for receiving, from a rules engine, access to a plurality of strings of code associated with a file, wherein the plurality of strings of code comprise one or more non-updated strings of code, means for scanning the plurality of strings of code, means for identifying, based on scanning the plurality of strings of code, at least one non-updated string of code of the one or more non-updated strings of code uniquely associated with the handler, means for updating the at least one non-updated string of code identified by the handler for display on a display screen, and means for transmitting, to the rules engine, a first indication that the at least one non-updated string of code of the one or more non-updated strings of code uniquely associated with the handler is an updated string of code for display on the display screen.

In one aspect, the aforementioned means for receiving, from a rules engine, access to a plurality of strings of code associated with a file, wherein the plurality of strings of code comprise one or more non-updated strings of code, means for scanning the plurality of strings of code, means for identifying, based on scanning the plurality of strings of code, at least one non-updated string of code of the one or more non-updated strings of code uniquely associated with the handler, means for updating the at least one non-updated string of code identified by the handler for display on a display screen, and means for transmitting, to the rules engine, a first indication that the at least one non-updated string of code of the one or more non-updated strings of code uniquely associated with the handler is an updated string of code for display on the display screen may be the processor(s) 1904 shown in FIG. 19 configured to perform the functions recited by the aforementioned means. For example, the aforementioned means for receiving, from a rules engine, access to a plurality of strings of code associated with a file, wherein the plurality of strings of code comprise one or more non-updated strings of code may include the receiving circuitry 1940 together with the network interface 1910 shown in FIG. 19. As another example, the aforementioned means for scanning the plurality of strings of code may include the scanning circuitry 1942 shown in FIG. 19. As yet another example, the aforementioned means for identifying, based on scanning the plurality of strings of code, at least one non-updated string of code of the one or more non-updated strings of code uniquely associated with the handler may include the identifying circuitry 1944 shown in FIG. 19. As yet another example, the aforementioned means for updating the at least one non-updated string of code identified by the handler for display on a display screen may include the updating circuitry 1946 shown in FIG. 19. As yet another example, the aforementioned means for transmitting, to the rules engine, a first indication that the at least one non-updated string of code of the one or more non-updated strings of code uniquely associated with the handler is an updated string of code for display on the display screen may include the transmitting circuitry 1948 together with the network interface 1910 shown in FIG. 19. In another aspect, the aforementioned means may be a circuit or any apparatus configured to perform the functions recited by the aforementioned means.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature, or function or embodied in several components, steps, or functions. Additional stages, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to a stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system comprising:
    a memory storing a plurality of files that each includes a plurality of strings of code; and
    one or more processors in communication with the memory, wherein the one or more processors:
        receive a message that indicates an identified issue and that includes a filename of a one of the files that includes a non-updated string of code;
        use the message to select a handler for updating the non-updated string of code, the handler including a search string and a replacement string;
        scan the plurality of strings of code;
        use the search string to identify, while scanning the one of the files, the non-updated string of code; and
        modify the one of the files by updating the non-updated string of code identified using the search string by using the replacement string to rewrite the non-updated string of code within the one of the files.

2. The system of claim 1, wherein:
    a second one of the files includes a second non-updated string of code;
    a second message indicates the identified issue and includes a second filename of the second one of the files;
    the second message is used to select the handler;
    the search string is used to identify the second non-updated string of code; and
    the second one of the files is modified by using the replacement string to rewrite the second non-updated string of code within the second one of the files.

3. The system of claim 1, wherein:
the one of the files includes a second non-updated string of code;
a second message indicates a second identified issue and includes the filename of the one of the files;
the second message is used to select a second handler that includes a second search string and that includes a second replacement string;
the second search string is used to identify the second non-updated string of code; and
the one of the files is modified by using the second replacement string to rewrite the second non-updated string of code within the one of the files.

4. The system of claim 1, wherein modifying the one of the files includes:
rewriting a syntax of the non-updated string of code;
updating a variable of the non-updated string of code; or
updating an object of the non-updated string of code.

5. The system of claim 1, wherein modifying the one of the files includes:
changing the non-updated string of code from an initial version of the code to an updated version of the code.

6. The system of claim 5, wherein the updated version of the code includes a version of a class immediately preceding the version of the class in the initial version of the code.

7. The system of claim 5, wherein the updated version of the code includes a most recent version of a class.

8. A method comprising:
storing a plurality of files that each includes a plurality of strings of code;
storing a plurality of handlers that each include a search string and a replacement string;
receiving a message that indicates an identified issue and that includes a filename of a one of the files that includes a non-updated string of source code;
using the message to select a one of the handlers for updating the non-updated string of source code;
identifying the non-updated string of source code within the one of the files by using the search string to identify, while scanning the one of the files, the non-updated string of source code; and
using the replacement string of the one of the handlers to modify the one of the files by modifying the non-updated string of source code identified by the one of the handlers.

9. The method of claim 8, wherein:
a second one of the files includes a second non-updated string of source code;
a second message indicates the identified issue and includes a second filename of the second one of the files;
the second message is used to select the one of the handlers;
the search string is used to identify the second non-updated string of source code in the second one of the files; and
the second one of the files is modified by using the replacement string to rewrite the second non-updated string of source code within the second one of the files.

10. The method of claim 8, wherein:
the one of the files includes a second non-updated string of source code;
a second message indicates a second identified issue and includes the filename of the one of the files;
the second message is used to select a second handler that includes a second search string and that includes a second replacement string;
the second search string is used to identify the second non-updated string of source code; and
the one of the files is modified by using the second replacement string to rewrite the second non-updated string of source code within the one of the files.

11. The method of claim 8, wherein modifying the one of the files includes:
rewriting a syntax of the non-updated string of source code;
updating a variable of the non-updated string of source code; or
updating an object of the non-updated string of source code.

12. The method of claim 8, wherein modifying the one of the files includes:
changing the non-updated string of source code from an initial version to an updated version.

13. The method of claim 12, wherein the updated version includes a version of a class immediately preceding the version of the class in the initial version.

14. The method of claim 12, wherein the updated version of the code includes-a most recent version of a class.

15. A method comprising:
storing a file that includes a plurality of strings of code that includes a non-updated string of code;
storing a handler that includes a search string and a replacement string;
receiving a message that includes text that identifies an identified issue and that includes a filename of the file;
identifying the non-updated string of code within the file by scanning file for string matching the search string;
modifying the file by using the replacement string to rewrite the non-updated string of code; and
transmitting a first indication that the non-updated string of code is an updated string of code.

16. The method of claim 15, further including:
receiving an indication that the handler is of a set of at least two handlers selected for modifying the non-updated string of code,
wherein the set of at least two handlers modify the file by updating the non-updated string of code.

17. The method of claim 15, wherein modifying the file includes:
rewriting a syntax of the non-updated string of code,
updating a variable of the non-updated string of code, or
updating an object of the non-updated string of code.

18. The method of claim 15, wherein modifying the file includes:
producing an updated version of the code by changing the non-updated string of code from an initial version of a class to an updated version of the class.

19. The method of claim 18, wherein the updated version of the code includes a version of the class immediately preceding the version of the class in the non-updated string of code.

20. The method of claim 18, wherein the updated version of the class includes a most recent version of the class.

* * * * *